US011425575B1

(12) United States Patent
Viorel et al.

(10) Patent No.: US 11,425,575 B1
(45) Date of Patent: Aug. 23, 2022

(54) SYSTEMS AND METHOD FOR WIRELESS COMMUNICATION OVER A COMMON WIRELESS BANDWIDTH

(71) Applicant: CABLE TELEVISION LABORATORIES, INC., Louisville, CO (US)

(72) Inventors: Dorin Gheorghe Viorel, Erie, CO (US); Ruoyu Sun, Westminster, CO (US); Lili Hervieu, Buford, GA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/133,441

(22) Filed: Dec. 23, 2020

Related U.S. Application Data

(60) Provisional application No. 62/952,616, filed on Dec. 23, 2019, provisional application No. 63/027,010, filed on May 19, 2020.

(51) Int. Cl.
*H04W 16/14* (2009.01)
*H04W 72/04* (2009.01)

(52) U.S. Cl.
CPC ....... *H04W 16/14* (2013.01); *H04W 72/0453* (2013.01)

(58) Field of Classification Search
CPC .................... H04W 16/14; H04W 72/0453
See application file for complete search history.

(56) References Cited

U.S. PATENT DOCUMENTS

2012/0327916 A1* 12/2012 Ahn .................. H04L 1/1671
370/336

* cited by examiner

*Primary Examiner* — Curtis B Odom
(74) *Attorney, Agent, or Firm* — Lathrop GPM LLP

(57) ABSTRACT

Systems and methods provide for use of spectrum emission masks to allow for two or more devices to coexist on a common communication bandwidth. The spectrum emission masks may include one, two, or three interior attenuation regions that, when implemented by a transmitting device, significantly reduce the transmission power in the interior attenuation regions. The interior attenuation regions may transmit to interior channels that separate one, two, or three outer channels of a plurality of channels spanning the common communication bandwidth.

29 Claims, 23 Drawing Sheets

| Existing Signal | | SEM | SNR Degradation (dB) | | | | |
|---|---|---|---|---|---|---|---|
| | | | $\Delta P_{RX} = -30\ dB$ | $\Delta P_{RX} = -20\ dB$ | $\Delta P_{RX} = -10\ dB$ | $\Delta P_{RX} = 0\ dB$ | $\Delta P_{RX} = 10\ dB$ | $\Delta P_{RX} = 20\ dB$ |
| Strong (SNR = 30 dB) | 1st dev: Ch 2 | 1000 | 8.1 | 8.1 | 7.8 | 6.1 | 2.5 | 0.4 |
| | 2nd dev: Ch 1 and 4 | 1100 | 5.8 | 5.7 | 5.5 | 4 | 1.3 | 0.2 |
| | | 1200 | 4.4 | 4.4 | 4.1 | 2.8 | 0.8 | 0.1 |
| Weak (SNR = 10 dB) | 1st dev: Ch 2 | 1000 | 7.8 | 6.1 | 2.5 | 0.4 | 0 | 0 |
| | 2nd dev: Ch 1 and 4 | 1100 | 5.5 | 4 | 1.3 | 0.2 | 0 | 0 |
| | | 1200 | 4.1 | 2.8 | 0.8 | 0.1 | 0 | 0 |
| Strong (SNR = 30 dB) | 1st dev: Ch 3 | 1000 | 8.1 | 8.1 | 7.8 | 6.1 | 2.4 | 0.4 |
| | 2nd dev: Ch 1 and 4 | 1100 | 5.8 | 5.7 | 5.5 | 4 | 1.3 | 0.2 |
| | | 1200 | 4.4 | 4.4 | 4.1 | 2.8 | 0.8 | 0.1 |
| Weak (SNR = 10 dB) | 1st dev: Ch 3 | 1000 | 7.8 | 6.1 | 2.4 | 0.4 | 0 | 0 |
| | 2nd dev: Ch 1 and 4 | 1100 | 5.5 | 4 | 1.3 | 0.2 | 0 | 0 |
| | | 1200 | 4.1 | 2.8 | 0.8 | 0.1 | 0 | 0 |

FIG. 13

| Existing Signal | | SEM | SINR Degradation (dB) | | | | | |
|---|---|---|---|---|---|---|---|---|
| | | | $\Delta P_{RX} = -30$ dB | $\Delta P_{RX} = -20$ dB | $\Delta P_{RX} = -10$ dB | $\Delta P_{RX} = 0$ dB | $\Delta P_{RX} = 10$ dB | $\Delta P_{RX} = 20$ dB |
| 1st dev. Ch 2 / 2nd dev. Ch 1 | Strong (SNR = 30 dB) | 1402 | 8.7 | 8.7 | 8.3 | 6.3 | 2.5 | 0.4 |
| | | 1404 | 6.3 | 6.3 | 5.9 | 4.2 | 1.4 | 0.2 |
| | | 1406 | 2.7 | 2.7 | 2.4 | 1.3 | 0.3 | 0 |
| 1st dev. Ch 2 / 2nd dev. Ch 1 | Weak (SNR = 10 dB) | 1402 | 8.3 | 6.3 | 2.5 | 0.4 | 0 | 0 |
| | | 1404 | 5.9 | 4.2 | 1.4 | 0.2 | 0 | 0 |
| | | 1406 | 2.4 | 1.3 | 0.3 | 0 | 0 | 0 |
| 1st dev. Ch 3 / 2nd dev. Ch 1 and 4 | Strong (SNR = 30 dB) | 1402 | 20.1 | 19.8 | 17.6 | 10.9 | 3.6 | 0.5 |
| | | 1404 | 15.1 | 14.8 | 12.7 | 6.6 | 1.5 | 0.2 |
| | | 1406 | 12.1 | 11.8 | 9.8 | 4.3 | 0.8 | 0.1 |
| 1st dev. Ch 3 / 2nd dev. Ch 1 and 4 | Weak (SNR = 10 dB) | 1402 | 17.6 | 10.9 | 3.6 | 0.5 | 0.1 | 0 |
| | | 1404 | 12.7 | 6.6 | 1.5 | 0.2 | 0 | 0 |
| | | 1406 | 9.8 | 4.3 | 0.8 | 0.1 | 0 | 0 |
| 1st dev. Ch 4 / 2nd dev. Ch 1 | Strong (SNR = 30 dB) | 1402 | 20.4 | 20.1 | 17 | 1.1 | 3.6 | 0.5 |
| | | 1404 | 15.4 | 15.1 | 12.8 | 6.6 | 1.5 | 0.2 |
| | | 1406 | 12.4 | 12.1 | 9.9 | 4.4 | 0.8 | 0.1 |
| 1st dev. Ch 4 / 2nd dev. Ch 1 | Weak (SNR = 10 dB) | 1402 | 17.8 | 1.1 | 3.6 | 0.5 | 0.1 | 0 |
| | | 1404 | 12.8 | 6.6 | 1.5 | 0.2 | 0 | 0 |
| | | 1406 | 9.9 | 4.4 | 0.8 | 0.1 | 0 | 0 |

FIG. 15

| Existing Signal | | SEM | SINR Degradation (dB) | | | | | | |
|---|---|---|---|---|---|---|---|---|---|
| | | | $\Delta P_{RX} = -30\text{ dB}$ | $\Delta P_{RX} = -20\text{ dB}$ | $\Delta P_{RX} = -10\text{ dB}$ | $\Delta P_{RX} = 0\text{ dB}$ | $\Delta P_{RX} = 10\text{ dB}$ | $\Delta P_{RX} = 20\text{ dB}$ |
| 1st dev: Ch 3 | Strong | 1602 | 3.8 | 3.8 | 3.7 | 3.3 | 1.6 | 0.3 |
| 2nd dev: Ch 1 and 2 | (SNR = 30 dB) | 1604 | 1.4 | 1.4 | 1.4 | 1.2 | 0.5 | 0.1 |
| | | 1606 | 0 | 0 | 0 | 0 | 0 | 0 |
| 1st dev: Ch 3 | Weak | 1602 | 3.7 | 3.3 | 1.6 | 0.3 | 0 | 0 |
| 2nd dev: Ch 1 and 2 | (SNR = 10 dB) | 1604 | 1.4 | 1.2 | 0.5 | 0.1 | 0 | 0 |
| | | 1606 | 0 | 0 | 0 | 0 | 0 | 0 |
| 1st dev: Ch 4 | Strong | 1602 | 14 | 13.9 | 13.1 | 9.4 | 3.4 | 0.5 |
| 2nd dev: Ch 1 and 2 | (SNR = 30 dB) | 1604 | 9 | 8.9 | 8.2 | 5 | 1.2 | 0.1 |
| | | 1606 | 6 | 5.9 | 5.3 | 2.8 | 0.5 | 0.1 |
| 1st dev: Ch 4 | Weak | 1602 | 13.1 | 9.4 | 3.4 | 0.5 | 0.1 | 0 |
| 2nd dev: Ch 1 and 2 | (SNR = 10 dB) | 1604 | 8.2 | 5 | 1.2 | 0.1 | 0 | 0 |
| | | 1606 | 5.3 | 2.8 | 0.5 | 0.1 | 0 | 0 |

FIG. 17

| Existing Signal | | SEM | SINR Degradation (dB) | | | | | |
|---|---|---|---|---|---|---|---|---|
| | | | $\Delta P_{RX} = -30$ dB | $\Delta P_{RX} = -20$ dB | $\Delta P_{RX} = -10$ dB | $\Delta P_{RX} = 0$ dB | $\Delta P_{RX} = 10$ dB | $\Delta P_{RX} = 20$ dB |
| Strong (SNR = 30 dB) | 1st dev. Ch 4 | 1802 | 7.5 | 7.4 | 7.2 | 5.7 | 2.3 | 0.4 |
| | 2nd dev. Ch 1-3 | 1804 | 5.1 | 5.1 | 4.9 | 3.6 | 1.2 | 0.2 |
| | | 1806 | 1.9 | 1.9 | 1.7 | 1 | 0.2 | 0 |
| Weak (SNR = 10 dB) | 1st dev. Ch 4 | 1802 | 7.2 | 5.7 | 2.3 | 0.4 | 0 | 0 |
| | 2nd dev. Ch 1-3 | 1804 | 4.9 | 3.6 | 1.2 | 0.2 | 0 | 0 |
| | | 1806 | 1.7 | 1 | 0.2 | 0 | 0 | 0 |

FIG. 19

| N = 100 MHz | | 1st Frequency | 2nd Frequency | 3rd Frequency | 4th Frequency | 5th Frequency | 6th Frequency |
|---|---|---|---|---|---|---|---|
| SEM 2200 | Relative Frequency (MHz) | -0.4xN | -0.4xN+1 | -0.1xN | 0.1xN | -0.4xN-1 | 0.4xN |
| | Absolute Frequency (MHz) | -30 | -29 | -10 | 10 | 29 | 30 |
| | Delta Power (dBr) | 0 | -20 | -31 | -31 | -20 | 0 |
| SEM 2100 | Relative Frequency (MHz) | -0.4xN | -0.4xN+1 | -0.2xN | 0.2xN | -0.4xN-1 | 0.4xN |
| | Absolute Frequency (MHz) | -30 | -29 | -20 | 20 | 29 | 30 |
| | Delta Power (dBr) | 0 | -20 | -28 | -28 | -20 | 0 |
| SEM 2000 | Relative Frequency (MHz) | -0.4xN | -0.4xN+1 | -0.2xN | 0.2xN | -0.4xN-1 | 0.4xN |
| | Absolute Frequency (MHz) | -30 | -29 | -20 | 20 | 29 | 30 |
| | Delta Power (dBr) | 0 | -20 | -25 | -25 | -20 | 0 |

FIG. 23

| Existing Signal | | SEM | SINR Degradation (dB) | | | | | |
|---|---|---|---|---|---|---|---|---|
| | | | $\Delta P_{RX}$ = -30 dB | $\Delta P_{RX}$ = -20 dB | $\Delta P_{RX}$ = -10 dB | $\Delta P_{RX}$ = 0 dB | $\Delta P_{RX}$ = 10 dB | $\Delta P_{RX}$ = 20 dB |
| 1st dev: Ch 2 2nd dev: Ch 1 and 5 | Strong (SNR = 30 dB) | 2200 | 3 | 2.9 | 2.4 | 1.1 | 0.2 | 0 |
| | | 2100 | 2.2 | 2.1 | 1.7 | 0.6 | 0.1 | 0 |
| | | 2000 | 4.4 | 4.3 | 3.7 | 1.8 | 0.3 | 0 |
| | Weak (SNR = 10 dB) | 2200 | 2.7 | 1.8 | 0.8 | 0.1 | 0 | 0 |
| | | 2100 | 2 | 1.1 | 0.2 | 0 | 0 | 0 |
| | | 2000 | 4.2 | 2.9 | 0.8 | 0.1 | 0.1 | 0 |
| 1st dev: Ch 3 2nd dev: Ch 1 and 5 | Strong (SNR = 30 dB) | 2200 | 6.1 | 5.8 | 3.8 | 0.9 | 0.1 | 0 |
| | | 2100 | 9.1 | 8.7 | 6.3 | 1.9 | 0.3 | 0 |
| | | 2000 | 12.1 | 11.7 | 9 | 3.4 | 0.5 | 0.1 |
| | Weak (SNR = 10 dB) | 2200 | 5.1 | 2.2 | 0.3 | 0 | 0 | 0 |
| | | 2100 | 7.0 | 4 | 0.7 | 0.1 | 0.1 | 0 |
| | | 2000 | 10.8 | 6.2 | 1.5 | 0.2 | 0.2 | 0 |
| 1st dev: Ch 4 2nd dev: Ch 1 and 5 | Strong (SNR = 30 dB) | 2200 | 3 | 2.9 | 2.4 | 1.1 | 0.2 | 0 |
| | | 2100 | 2.2 | 2.1 | 1.7 | 0.6 | 0.1 | 0 |
| | | 2000 | 4.4 | 4.3 | 3.7 | 1.8 | 0.3 | 0 |
| | Weak (SNR = 10 dB) | 2200 | 2.7 | 1.8 | 0.5 | 0.1 | 0 | 0 |
| | | 2100 | 2 | 1.1 | 0.2 | 0 | 0 | 0 |
| | | 2000 | 4.2 | 2.9 | 0.8 | 0.1 | 0 | 0 |

FIG. 27

SYSTEMS AND METHOD FOR WIRELESS COMMUNICATION OVER A COMMON WIRELESS BANDWIDTH

RELATED APPLICATIONS

This application claims priority to, and benefits from, U.S. Provisional Patent Application Ser. No. 62/952,616, filed Dec. 23, 2019 and entitled "Spectrum Mask(s) in Punctured Channels." This application also claims priority to, and benefits from, U.S. Provisional Patent Application Ser. No. 63/027,010, filed May 19, 2020 and entitled "Spectrum Mask(s) in Punctured Channels." Each of the aforementioned applications is incorporated by reference in its entirety as if fully set forth.

BACKGROUND

The wireless communication spectrum includes "licensed" spectrum and "unlicensed" spectrum. Licensed spectrum utilizes wireless communications with time and spectrum coordination between each communicating device. Unlicensed spectrum allows for each communicating device to compete with other communicating device for a given bandwidth of spectrum at a given time. Unlicensed spectrum includes Wi-Fi (e.g., IEEE 802.11-based protocol), WiMAX (IEEE 802.16), new radio unlicensed (NR-U), LTE unlicensed (LTE-U), LTE License Assisted Access (LTE-LAA), and more.

Because many devices are competing for the same bandwidth, a device desiring to utilize a given bandwidth will implement a "listen before talk" (LBT) procedure. In the LBT procedure, the device will "listen" to the desired bandwidth and identify which spectrum in the given bandwidth is being utilized by other devices. In the current state of technology, the listening device waits until the desired bandwidth (or another bandwidth) is "unoccupied" (e.g., no other wireless communications are heard on the bandwidth that the device listens to). The LBT procedure can result in reduced data transmission time because the listening device needs to wait until a given bandwidth becomes available, or needs to dynamically adapt its bandwidth.

SUMMARY

The present embodiments acknowledge that devices need to be able to coexist on a given bandwidth of spectrum to scale the use of said spectrum to many devices. The present embodiments resolve this scalability problem by identifying unoccupied channels on a given bandwidth, and utilizing a spectrum emissions mask (SEM) to allow for transmission on those unoccupied channels while wrapping the power density of the transmission around the occupied channels so as not to interfere with the communication(s) occurring on the occupied channels. Allowing multiple devices to utilize a given bandwidth, even if one or more existing device is already using one or more channels within the given bandwidth, allows for scalability of the bandwidth to be used by more devices.

BRIEF DESCRIPTION OF THE FIGURES

FIG. 13 is a table detailing the differing impacts to the SINR from each of SEMs of FIGS. 10-12, for varying relative power ($\Delta P_{RX}$) and SNR of the existing signal.

FIG. 15 is a table detailing the differing impacts to the SINR from each of SEMs of FIG. 14, for varying relative power ($\Delta P_{RX}$) and SNR of the existing signal.

FIG. 17 is a table detailing the differing impacts to the SINR from each of SEMs of FIG. 16, for varying relative power ($\Delta P_{RX}$) and SNR of the existing signal.

FIG. 19 is a table detailing the differing impacts to the SINR from each of SEMs of FIG. 18, for varying relative power ($\Delta P_{RX}$) and SNR of the existing signal.

FIG. 23 is a table representation of SEMS of FIGS. 20-21.

FIG. 27 depicts a table representation of FIG. 26, as well as additional SINR degradation for a device operating on channel 2 and 4.

DETAILED DESCRIPTION OF THE EMBODIMENTS

Figure 1:
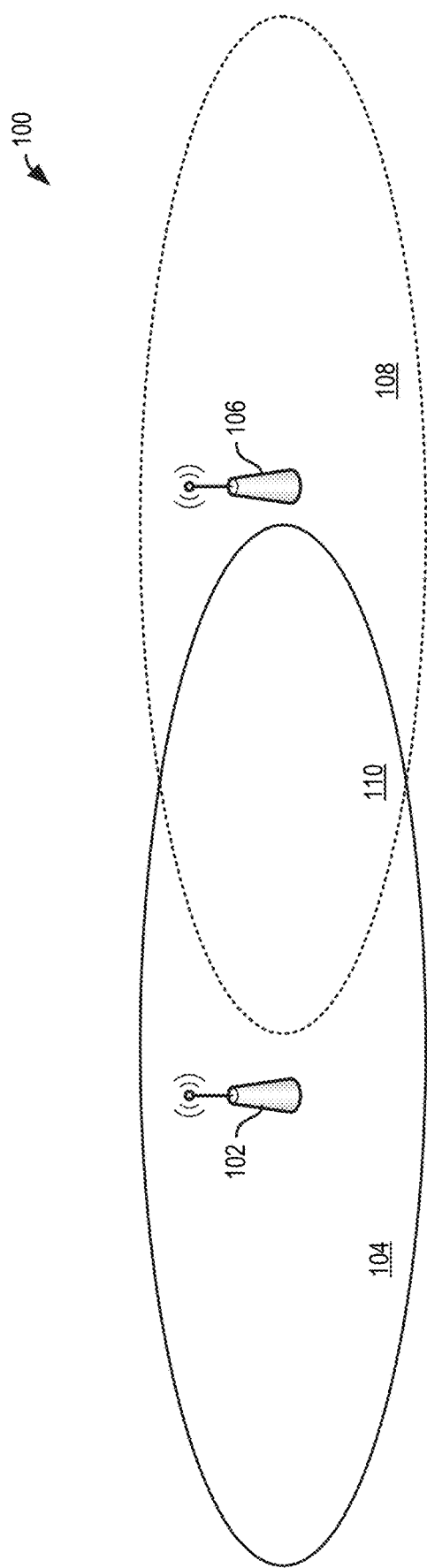
FIG. 1 depicts a wireless communication environment providing wireless communication over a common bandwidth.

FIG. 1 depicts a wireless communication environment 100 providing wireless communication over a common bandwidth. Environment 100 includes a first device 102 (also referred to herein as "speaking device 102") operating according to a first wireless communication protocol 104, and a second device 106 (also referred to herein as "listening device 106") operating according to a second wireless communication protocol 108. In one embodiment, the first wireless communication protocol 104 and the second wireless communication 108 are the same. In one embodiment, the first wireless communication protocol 104 and the second wireless communication 108 are different.

First device 102 and second device 106 may be any type of device that wirelessly communicates. For example, first device 102 and second device 106 may be a wireless communication base station (e.g., a cellular base station), a wireless communication router (e.g., a Wi-Fi router), a user equipment (UE) device (which includes, but is not limited to, cellular phones, Wi-Fi devices, laptops, tablets, computers, gaming consoles, etc.), or any other device that wirelessly transmits a wireless communication.

The term "wireless communication protocol" as used herein, such as with regards to first wireless communication protocol 104 and second wireless communication protocol 108, includes, but is not limited to, the standard-defined communication protocol such as 3G, 4G, LTE-U, 5G NR, 5G NR-U, IEEE 802 based protocol (including but not limited to 802.11-based protocol and 802.16-based protocol), CBRS, and the like. The term "wireless communication protocol" may also encompass a wireless operator (or carrier), such as Verizon, T-Mobile/Sprint, AT&T, and the like, as well as the various communication protocols implemented thereby such as CDMA, GSM, OFDMA, and the like. The present application is particularly advantageous to any unlicensed, unscheduled or partially scheduled, wireless communication protocols as compared to licensed wireless protocols because the licensed wireless protocols have specific scheduling configurations that do not result in the coexistence issues.

Figure 2:
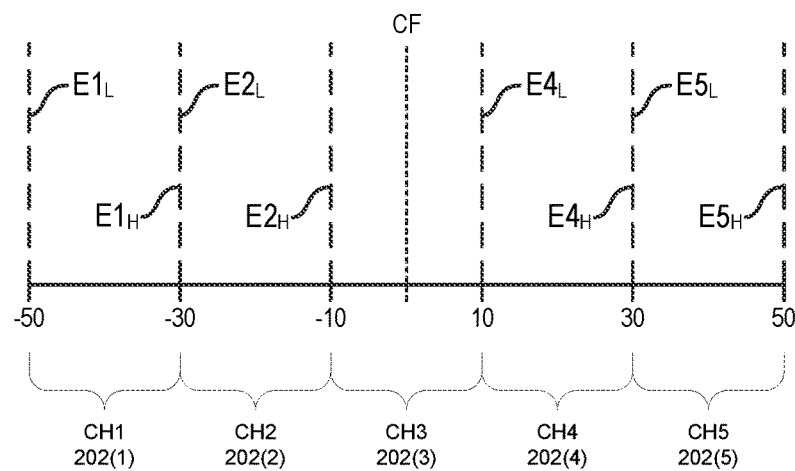
FIG. 2 depicts an example wireless communication bandwidth, spanning 100 MHz.

For purpose of illustration, in FIG. 1, each of the first device 102 and the second device 106 may be attempting to communicate over a common (the same) wireless communication bandwidth 110. FIG. 2 depicts an example wireless communication bandwidth 110, spanning 100 MHz. Wireless communication bandwidth 110 is a continuous range of frequency spectrum spanning −50 MHz to 50 MHz from a center frequency (CF). Wireless communication bandwidth 110 is divided into a plurality of channels 202(1)-(5). Each channel 202 spans 20 MHz, starting from the lowest frequency (e.g., −50 MHz from the CF) of the wireless communication bandwidth 110. It should be appreciated that each channel 202 may span a different amount of frequency (e.g., 20 MHz, 40 MHz, etc.) without departing from the scope hereof. The channel "number" is also illustrative. The width of common wireless bandwidth 110 in FIG. 2 is 100 MHz. However, it should be appreciated that any other width may be implemented without departing from the scope hereof, such as, but not limited to, 40 MHz, 60 MHz, 80 MHz, 160 MHz, 320 MHz, and other bandwidths designated by various wireless communication protocols. Each channel has a low edge ($EX_L$) and a high edge ($EX_H$), where X is the channel number.

Figure 3:
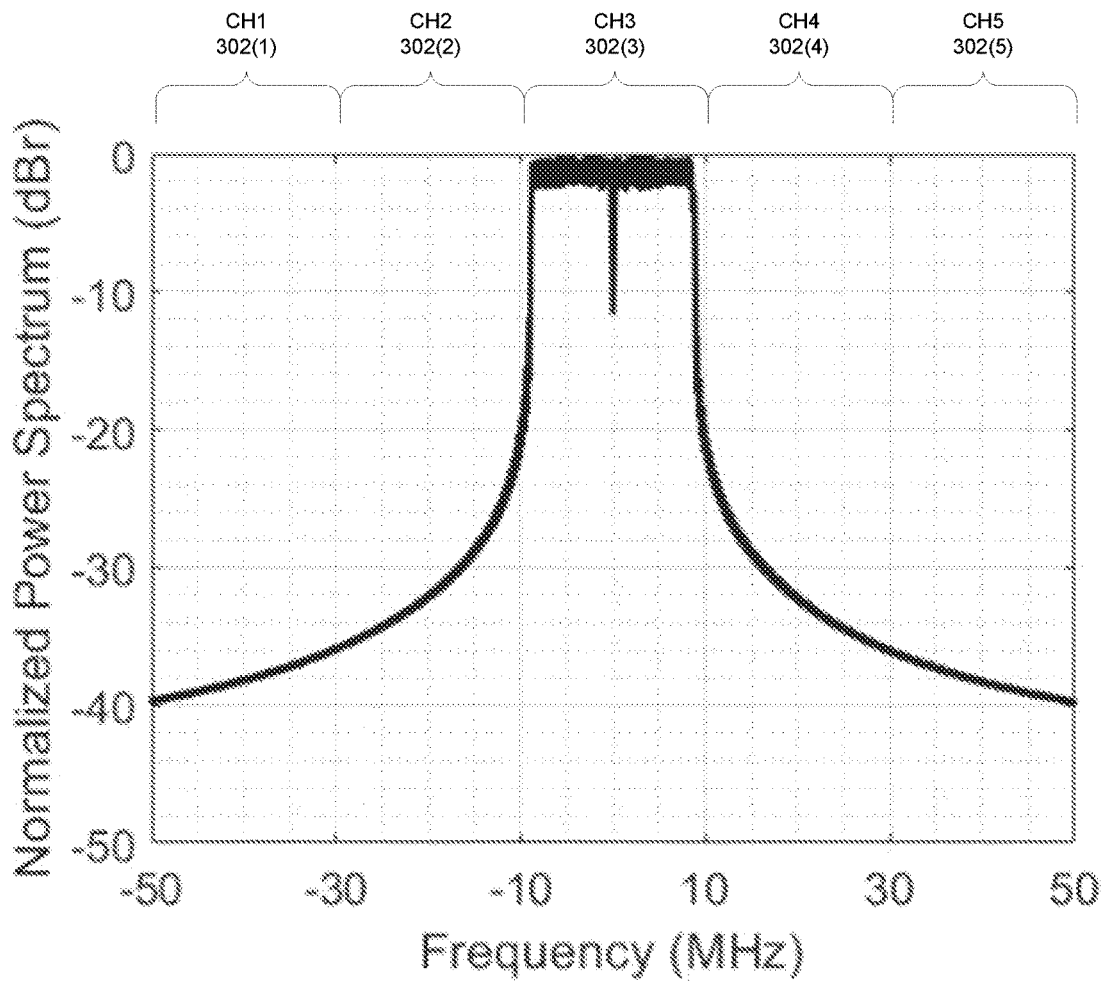
FIG. 3 depicts an example bandwidth, spanning 100 MHz, having an existing signal in an occupied channel.

Referring to FIG. 1, the first device 102 may be a "speaking device" in that, at a given time, is transmitting on one or more channels of the common wireless bandwidth 110. The second device 106 may be a "listening device" in that it desires to also use the common wireless bandwidth 110. At such time, the listening device 106 may scan the common wireless bandwidth 110 and identify which frequencies already have a signal present. FIG. 3 depicts an example bandwidth 300, spanning 100 MHz, having an existing signal 300 in an occupied channel (channel 3—spanning −10 MHz to 10 MHz around the center frequency of the bandwidth). The occupied channel is "occupied" because there is an existing signal therein. In the example of FIG. 3, the existing signal 300 is an 802.11ac OFDM waveform for a 20 MHz channel having the following parameters: 125 Hz frequency resolution; 312.4 kHz subcarrier spacing; 52 active subcarriers: [−28:−22−20:−8−6:−1 1:6 8:20 22:28]; 11 guard tones [−32:−29 29:31]; 1 DC component: [0]; 4 pilot tones (do not convey data): [−21 −7 7 21]; Random binary bits make the PSD fluctuate; the simulated PSD use is averaged over 1000 times.

The example bandwidth in FIG. 3 illustrates two unoccupied channels on each side of the occupied channel. If the listening device 106 desires to transmit a 40 MHz transmission, the listening device 106 may implement an edge mask that allows the second device 106 to transmit in either channels 1 and 2, or 4 and 5. According to the prior art, if the listening device 106 desires to transmit a 60 MHz transmission or greater, then, in the common bandwidth 110 illustrated in FIG. 3, the second device 106 must wait until 60 MHz of consecutive bandwidth becomes available. The present embodiments, via the spectrum emission masks discussed below, remedy this delay by allowing the listening device 106 to transmit in non-consecutive, unoccupied channels and effectively wrap its transmission around the occupied channel (channel 3 in the embodiment of FIG. 3).

Figure 4:
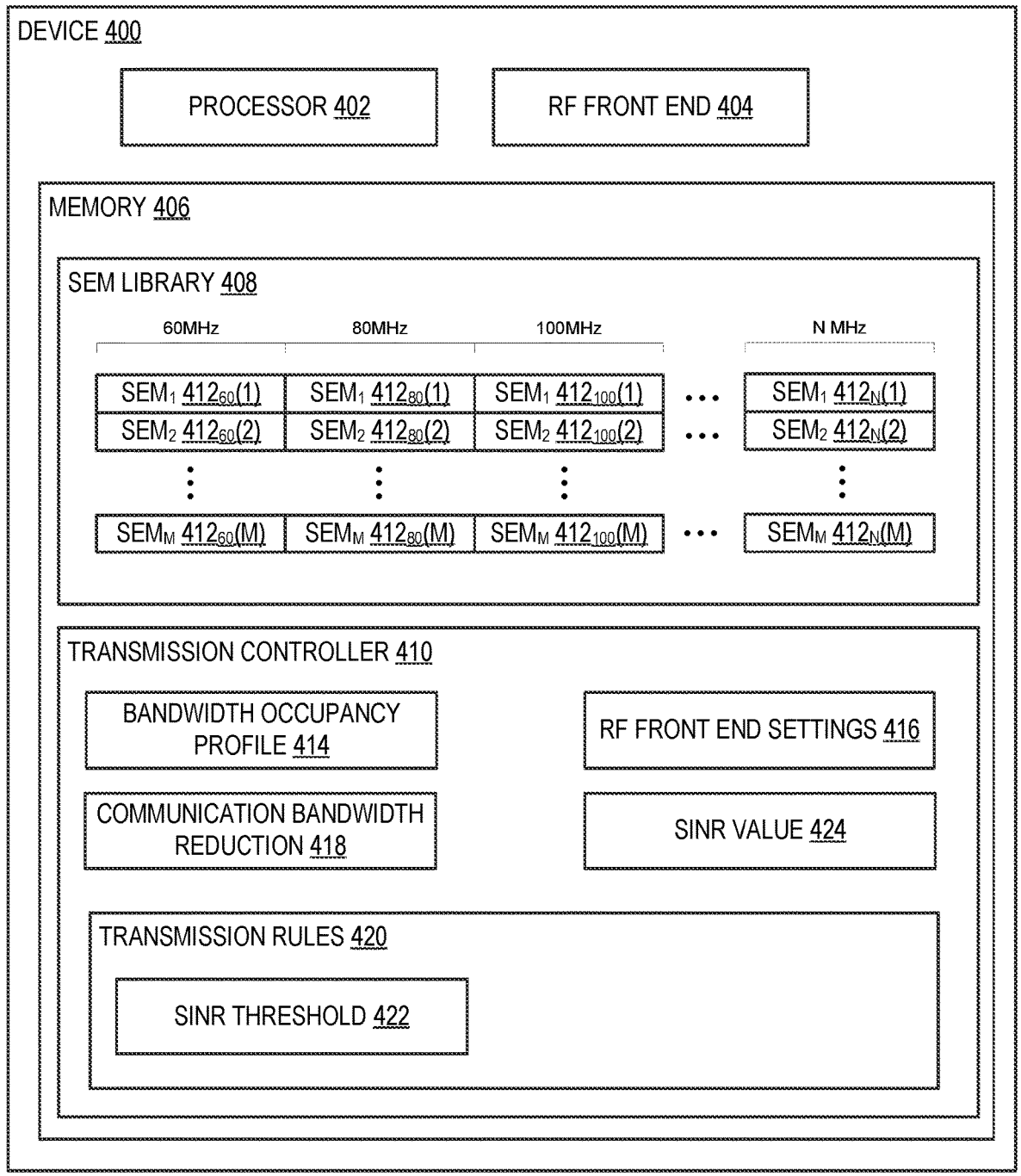
FIG. 4 depicts a device that allows for wireless communication with a second device (not shown) over a common wireless bandwidth, in embodiments.

FIG. 4 depicts a device 400 that allows for wireless communication with a second device (not shown) over a common wireless bandwidth, in embodiments. Device 400 is an example of second device 106 (e.g., a listening device). Device 400 includes a processor 402, an RF front-end 404, and a memory 406 storing a SEM library 408 and a transmission controller 410.

The processor 402 includes computing hardware capable of executing non-transitory computer readable instructions. For example, the processor 402 may be any one or more of a general-purpose computer, a digital signal processor, central processing unit (CPU), field-programmable gate array (FPGA), system-on-chip (SoC), or another type of integrated circuit capable of performing logic, control, and input/output operations.

The RF front-end 404 includes one or more devices or modules that incorporate circuitry necessary to transmit and/or receive RF wireless signals. For example, the RF front-end 404 includes necessary power amplifiers, mixers, oscillators, modulators, demodulators, filters, antennas, and other equipment as known in the art necessary to implement RF wireless transmission and reception.

Memory 406 includes, but is not limited to, a computer-readable medium, such as a random-access memory (RAM), and a computer-readable non-volatile medium, such as flash memory. Additionally, or alternatively, any other type of memory may be utilized without departing from the scope hereof.

The SEM library 408 defines a plurality of pre-stored spectrum emissions masks 412 that are selectable by the transmission controller 410 to configure the RF front-end 404 to transmit in a wireless communication bandwidth that is commonly used by another device. The SEM library 408 may be a look-up table, or another form of accessible database of SEMs 412. The SEM library 408 is shown having "M" SEMs 412, for N bandwidths. Each bandwidth (e.g., 60 MHz, 80 MHz, 100 MHz, N MHz) may have a different number of SEMs 412, or the same number of SEMs 412. The "N" stands for any bandwidth of the common wireless communication bandwidth, and may include wider and narrower frequency widths, such as 20 MHz, 40 MHz, 160 MHz, and 320 MHz, and other bandwidths used by given wireless communication protocols. Each SEM 412 may define a power spectrum density limit within a given wireless transmission bandwidth that enables transmission in a plurality of unoccupied channels in the given wireless transmission bandwidth. A specific SEM 412 may define the power spectrum density limit for the transmitting device transmitting according to the SEM 412 to transmit on specific unoccupied channels in a common wireless communication bandwidth. Thus, as an example referring to FIG. 3, a given SEM 412100(X) may allow transmission in channels 302(1), 302(2), 303(4), and 303(5), while not transmitting in channel 303(3) so as not to interfere with the device already utilizing channel 303(3).

There may be a different SEM 412 for each specific combination of transmitted and non-transmitted channels. For example, one SEM 412 may limit power transmission on channel 302(2), and a second SEM 412 may limit power transmission on channel 302(3), a third SEM 412 may limit power transmission on channel 302(4), a fourth SEM 412 may limit power transmission on channels 302(2) and 302(3), a fifth SEM 412 may limit power transmission on channels 302(3) and 302(4), and a sixth SEM 412 may SEM 412 may limit power transmission on channels 302(2), 302(3), and 302(4). The above examples indicate examples of "interior-non-transmitted-channel" SEMs, in which the edges of the wireless bandwidth are used for transmission, and one or more interior channels are non-transmitted. The SEMs 412, however, may further include "edge masks" in which one or more edge channels (either at the upper or lower frequencies of the wireless communication bandwidth) are designated for non-transmission.

The transmission controller 410 includes computer readable instructions that, when executed by the processor 402, cause the processor 402 to implement the functionality of the transmission controller 410 discussed herein. When the device 400 desires to utilize a wireless communication bandwidth (e.g., wireless communication bandwidth 110), the transmission controller 410 may control the RF front-end 404 and implement a "listen before talk" function to scan the wireless communication bandwidth to determine a bandwidth occupancy profile 414. The bandwidth occupancy profile 414 defines which channels within the bandwidth are occupied by one or more wireless communications. For example, if the first device 102 (e.g., speaking device) is communicating on channel 3 of the 100 MHz bandwidth shown in FIG. 3, then the bandwidth occupancy profile 414 may indicate that channel 3 (302(3)) is occupied, and channels 1, 2, 4, and 5 are unoccupied.

The transmission controller 410 may then query the SEM library 408 to identify one or more SEMs 412 that permit transmission in the wireless communication bandwidth 110 without interfering with the current transmissions occurring on the occupied channels as identified in the bandwidth occupancy profile 414. As one example, when the bandwidth occupancy profile 414 defines a first of the plurality of the non-contiguous unoccupied channels (e.g., channel 302(2)) is separated from a second of the plurality of the non-contiguous unoccupied channels (e.g., channel 302(4)) by a single occupied channel (e.g., channel 302(3)), the transmission controller 410 may select from a group of SEMs including a single-interior-non-transmitted-channel SEM and a double-interior-non-transmitted-channel SEM. This example may be used when the bandwidth is 60 MHz or greater. The group of SEMs may further include a triple-interior-non-transmitted-channel SEM when the bandwidth is 100 MHz or greater. As another example, when the bandwidth occupancy profile 414 defines a first of the plurality of the non-contiguous unoccupied channels (e.g., channel 302(2)) is separated from a second of the plurality of the non-contiguous unoccupied channels (e.g., channel 302(5)) by a two occupied channels (e.g., channel 302(3), 302(4)), the transmission controller 410 may select from a group of SEMs including a s a double-interior-non-transmitted-channel SEM. The group of SEMs may further include a triple-interior-non-transmitted-channel SEM when the bandwidth is 100 MHz or greater. The group of SEMs may further include more than three-interior-non-transmitted channels if the bandwidth is large enough to support transmission on two or more channels separated by four or more non-transmitted channels.

Based on the selected SEM 412, the transmission controller 410 may generate RF front-end settings 416 that are used to configure the RF front-end 404. Based on the RF front-end settings 416, the device 400 then wirelessly transmit within the wireless transmission bandwidth at a transmission power spectrum at or below the power spectrum density limit defined by the selected SEM 412.

In embodiments, when the transmission controller 410 is unable to identify an SEM 412 that enables enough bandwidth for the device 400 to transmit a communication, the transmission controller 410 may generate a communication bandwidth reduction 418. The communication bandwidth reduction 418 reconfigures the communication to transmit at a lower bandwidth. For example, if a desired communication requires 60 MHz of bandwidth, but the cumulative bandwidth of the non-occupied channels defined in the bandwidth occupancy profile 414 only spans 40 MHz, the communication bandwidth reduction 418 may reduce the bandwidth of the output transmission to be 40 or 20 MHz so that it can "fit" within the non-occupied bandwidth of the common wireless communication bandwidth (e.g., bandwidth 110 of FIG. 1).

The transmission controller 410 may also operate in accordance with one or more transmission rules 420. Transmission rules 420 may be protocol-specific, or protocol-agnostic. For example, one protocol-specific rule applies when the device 400 is transmitting according to a Wi-Fi standard, such rule 420 may permit use of the SEMs only when the occupied channel is not a primary Wi-Fi channel. While the current application of transmission rules 420 discusses 802-based primary and secondary channels, it will be understood that the current systems and methods (including any discussion of transmission rules 420, and other Wi-Fi based functionality discussed herein) may be applied to the primary and secondary channels in other 802-based and non-802-based communications protocols at a time when those protocols are amended or evolve to include such primary and secondary channel (or other channels) applications. Such an implementation would be readily apparent to one skilled in the art after reading and understanding the present disclosure.

Additionally, or alternatively, a transmission rule 420 may limit the number of occupied channels that can be "skipped". For example, in certain embodiments implementing a Wi-Fi protocol, when transmitting on an 80 MHz frame, only a single-non-transmitting-interior-channel SEM may be utilized that allows for 20 MHz occupied channel to be "wrapped" by transmitting channels.

Another example of transmission rules 420 may include signal-to-interference-plus-noise (SINR) threshold 422. The transmission controller 410 may calculate a SINR value 424 based on the bandwidth occupancy profile 414. The SINR value 424 defines the amount of interference on the existing transmission in the wireless communication bandwidth 110. The SINR value 424 accounts for interference on the existing transmission from the first device 102 from the second device 106 also using the common bandwidth 110, as well as noise interference.

Figure 5:
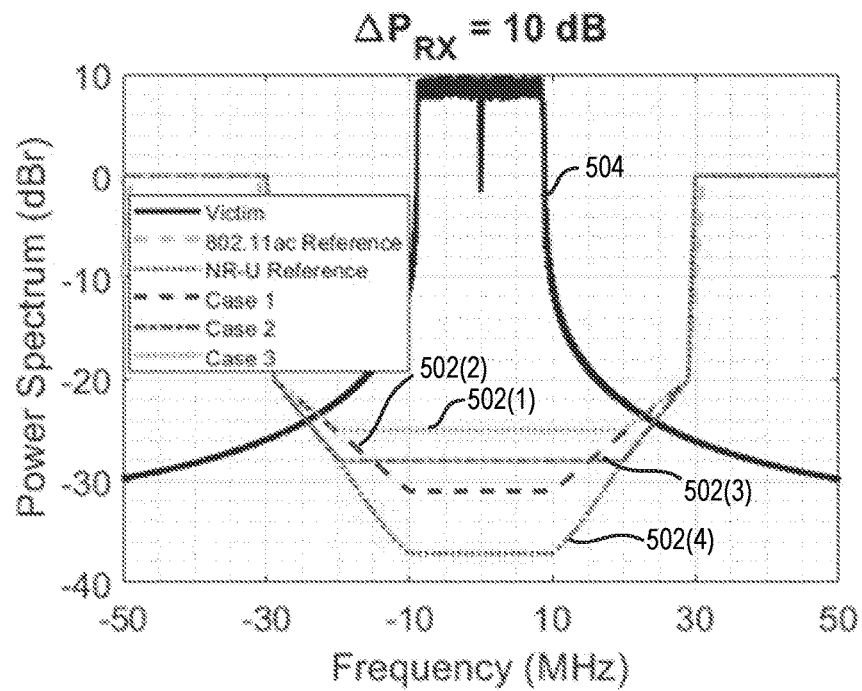
FIG. 5 depicts a relative power level of 10 dBr.
Figure 6:
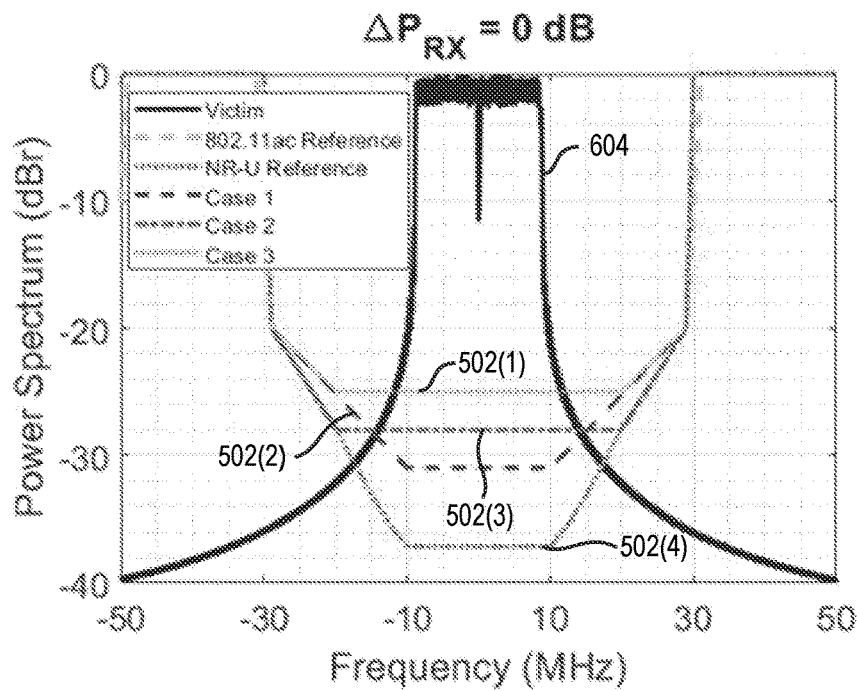
FIG. 6 depicts a relative power level of 0 dBr.
Figure 7:
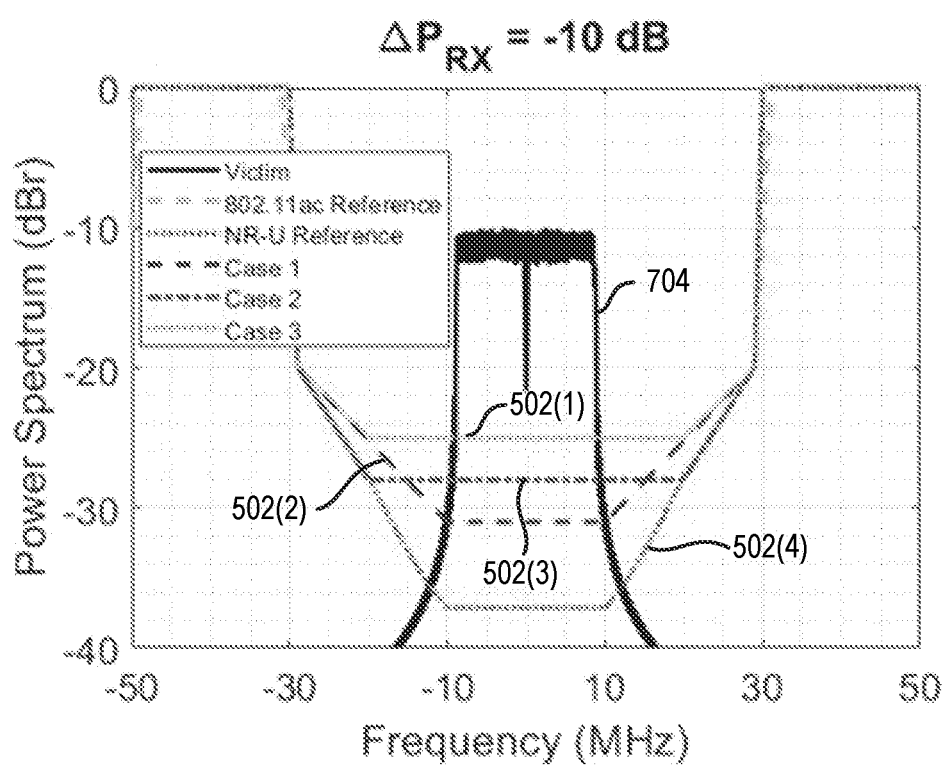
FIG. 7 depicts a relative power level of −10 dBr.

The relative transmission power of the first device 102 as compared to the second device 106 impacts the calculated SINR value 424. For example, FIGS. 5-7 depict interference potential for a variety of SEMs 502(1)-(4), depending on the relative power ($\Delta P_{RX}$) of an existing signal 504, 604, 704 from the first device 102 compared to the SEM 502. FIG. 5 depicts a relative power level of 10 dBr; FIG. 6 depicts a relative power level of 0 dBr; and FIG. 7 depicts a relative power level of −10 dBr. As can be seen, signals that are transmitted with power levels at or lower than the max levels defined by each SEM 502(1)-(4) have a greater interference on the existing signal 504, 604, and 704. The $\Delta P_{RX}$ equals $P_{RX}$(speaking device) $-P_{RX}$(listening device), which represents relative location (distance or path loss) between speaking device transmitter to speaking device receiver, and between listening device transmitter and speaking device receiver.

Based on relative power, the transmission controller 410 may calculate the SINR value 424. In embodiments, the SINR value is calculated using equation 1, below.

$$SINR = \frac{1}{\frac{1}{SNR} + \frac{1}{SIR}} \qquad \text{Equation 1}$$

where SNR is the existing signal (e.g., from the first device 102) to noise ratio, and SIR is the existing signal (e.g., from the first device 102) to interference of a new signal (e.g., from the second device 106) if transmitted according to a given SEM 412. The noise ratio may be calculated based on common noise values for a given wireless protocol. For example, for 802.11n/ac, 2 values may be used covering cell edge (SNR=10 dB, RSSI=−86 dBm) and cell center (SNR=25 dB, RSSI=−71 dBm), which are based on a Noise Floor of −101 dBm/20 MHz and a Noise Figure of 5 dB. The calculated SINR value 424 may be an absolute value (e.g., a Maximum), or an averaged value over a frequency range. The SIR may account for the relative power $\Delta P_{RX}$ of the existing signal from first device 102 to the potential new signal from the second device 106 were said second device to utilize a given SEM in the common wireless communication bandwidth 110.

The transmission controller 410 may compare the calculated SINR value 424 to the SINR threshold 422 and disregard ones of the SEMs 412 when use of a given SEM 412 will result in an SINR value 424 that breaches the SINR threshold 422. A high SINR is desirable, which means that the existing signal (e.g., from first device 102) will have less interference on a new signal (e.g., from the second device 106).

As discussed above, the SEMs 412 may also include edge masks. Comparison of a calculated SINR value 424 to an SINR threshold 422 may also apply to potential edge masks, without departing from the scope hereof.

Figure 8:
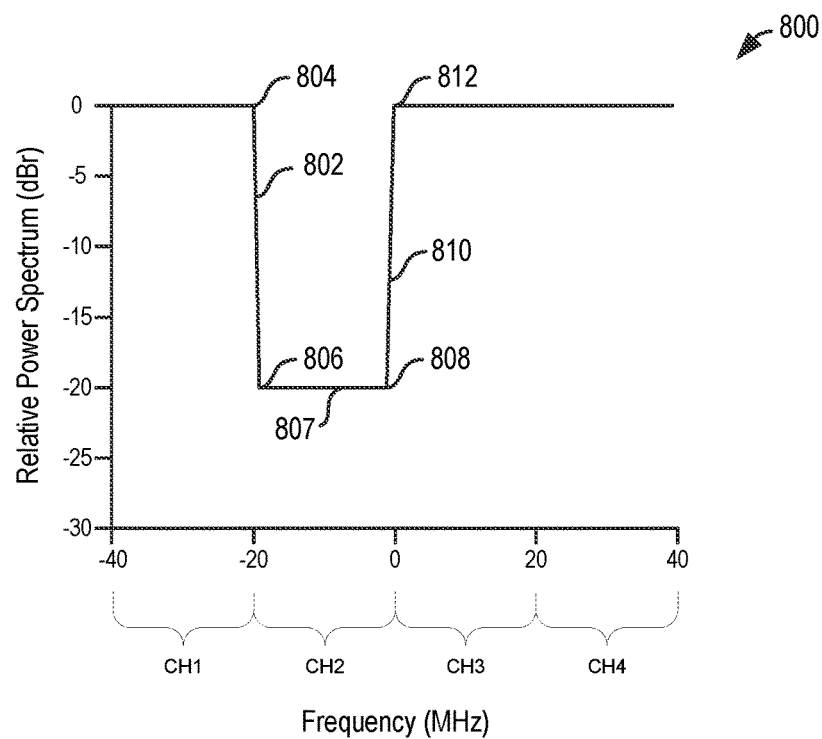
FIG. 8 depicts an example SEM for a single-interior-non-transmitting-channel, in embodiments.

Example SEM Shapes:

FIG. 8 depicts an example SEM 800 for a single-interior-non-transmitting-channel, in embodiments. SEM 800 is an example of one of SEM 412 discussed above. SEM 800 may be used in any wireless communication bandwidths to "wrap" around a single occupied channel.

SEM 800 illustrates a non-transmitting channel 2. A similar shape of SEM 800, as shown and discussed below, may be used for channel 3, and/or other interior channels of a greater or smaller width wireless communication bandwidth. SEM 800 is shown for an 80 MHz bandwidth, but could also apply to any other bandwidth widths, including, but not limited to 60 MHz, 100 MHz, 160 MHz, 320 MHz, etc. In channels 1, 3, and 4 there is no relative power attenuation. SEM 800 includes a first power attenuation 802 between a first frequency 804 and a second frequency 806. In the example of SEM 800, first frequency 804 is the low edge (E2$_L$) of channel 2, and the second frequency 806 is at least 1 MHz greater than the first frequency 804. The second frequency 806 may be greater or less than 1 MHz from the first frequency 804 without departing from the scope hereof. The first attenuation 802 is from 0 dBr to −20 dBr (e.g., the power spectrum limit is 0 dBr at first frequency 804, and −20 dBr at second frequency 806). The unit "dBr" as used herein means "decibel relative to reference level," which is the relative power between inside the transmission channel outside the transmission (adjacent) channel. Each SEM is typically defined as dBr in 3GPP and 802.11 specs. 0 dBr means the power is equal to the reference power which is typical inside the transmission channel.

SEM 800 includes a constant attenuation 807 of −20 dBr between second frequency 806 and third frequency 808. In other words, at and between each of the second frequency 806 and third frequency 808, the power spectrum limit is −20 dBr. The third frequency 808 is at least 19 MHz greater than the first frequency 804. The third frequency 808 may be greater or less than 19 MHz from the first frequency 804 without departing from the scope hereof.

SEM includes a second power attenuation 810 between the third frequency 808 and a fourth frequency 812. In the example of SEM 800, fourth frequency 812 is the high edge (E2$_H$) of channel 2. The second attenuation 810 is from −20 dBr to 0 dBr (e.g., the power spectrum limit is −20 dBr at third frequency 808, and 0 dBr at fourth frequency 812).

In embodiments, SEM 800 is particularly useful for a single-non-transmitting-channel by a device (e.g., second device 106) operating according to an 802.11 WIFI-based protocol, particularly an 802.11ax protocol. However, the SEM 800 may be used by a device operating according to other wireless (and/or multi-wireless) protocols without departing from the scope hereof. For example, the SEM 800 may be used in an 802.11 Wi-Fi-based wireless protocol, including but not limited to 802.11ax and/or Wi-Fi 6, as well as any other Wi-Fi based protocols. In such embodiments, use of the SEM 800 may coincide with a transmission rule 420 that only allows its use when the primary channel is unoccupied. As another example, SEM 800 may be used where one device is operating according to a Wi-Fi based protocol, and another device is operating according to a 5G NR-U protocol. Any other combination of unlicensed wireless protocols (including two devices operating according to the same protocol), including those discussed above, are contemplated herein.

Figure 9:
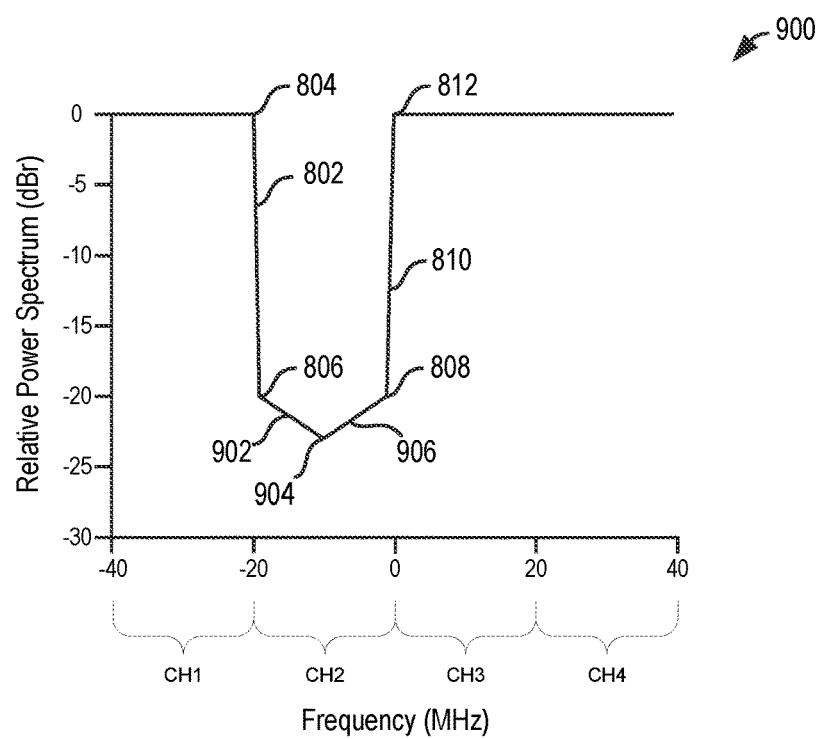
FIG. 9 depicts an example SEM for a single-interior-non-transmitting-channel, in embodiments.

FIG. 9 depicts an example SEM 900 for a single-interior-non-transmitting-channel, in embodiments. SEM 900 is an example of one of SEM 412 discussed above. SEM 900 may be used in any wireless communication bandwidths to "wrap" around a single occupied channel. SEM 900 is shown for an 80 MHz bandwidth, but could also apply to any other bandwidth widths, including, but not limited to 60 MHz, 100 MHz, 160 MHz, 320 MHz, etc.

SEM 900 illustrates a non-transmitting channel 2. A similar shape of SEM 900, as shown and discussed below, may be used for channel 3, and/or other interior channels of a greater or smaller width wireless communication bandwidth. SEM 900 is similar to SEM 800, and the first frequency 804, second frequency 806, third frequency 808, and fourth frequency 812, first attenuation 802, and second attenuation 810 are the same (and thus labeled the same). However, instead of constant attenuation 807, SEM 900 includes a third attenuation 902 between the second frequency 806 and a fifth frequency 904, and a fourth attenuation 906 between the fifth frequency 904 and the third frequency 808.

The fifth frequency 904 is shown as 10 MHz from the first frequency 804. The fifth frequency 904 may be greater or less than 10 MHz from the first frequency 804 without departing from the scope hereof. The third attenuation 902 is from −20 dBr to −23 dBr (e.g., the power spectrum limit is −20 dBr at second frequency 806, and −23 dBr at fifth frequency 904. The fourth attenuation 904 is from −23 dBr to −20 dBr (e.g., the power spectrum limit is −20 dBr at fifth frequency 904, and −20 dBr at third frequency 808. The lower value of the third and fourth attenuations 902, 906 may be higher or lower than −23 dBr without departing from the scope hereof, such as −25 dBr, −31 dBr, or any other attenuation value needed. The specific shape of the SEM may be defined by the hardware constraints of the device (e.g., second device 106) implementing the SEM.

In embodiments, SEM 900 is particularly useful for a single-non-transmitting-channel by a device (e.g., second device 106) operating according to an 5G NR-U protocol. However, the SEM 900 may be used by a device operating according to other wireless protocol (and/or multi-wireless protocol) transmissions without departing from the scope hereof. For example, the SEM 900 may be used in a device operating according to an 802.11 Wi-Fi-based wireless protocol, including but not limited to 802.11ax and/or Wi-Fi 6, as well as any other Wi-Fi based protocols. In such embodiments, use of the SEM 900 may coincide with a transmission rule 420 that only allows its use when the primary channel is unoccupied. As another example, SEM 900 may be used where one device is operating according to a Wi-Fi based protocol, and another device is operating according to a 5G NR-U protocol. Any other combination of unlicensed wireless protocols, including those discussed above, are contemplated herein.

Figure 10:
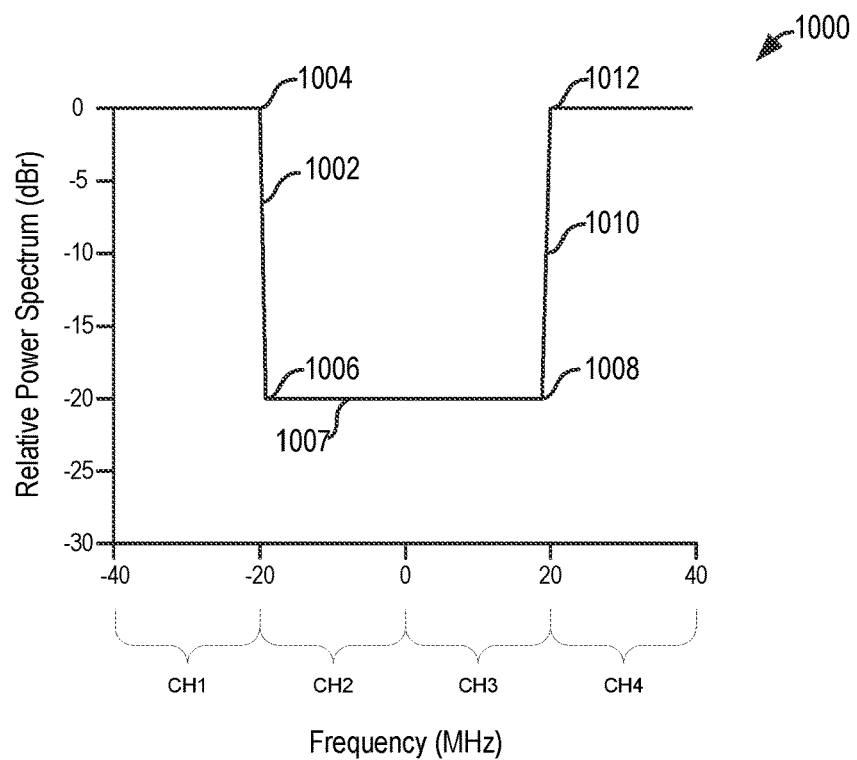
FIG. 10 depicts an example SEM for a double-interior-non-transmitting-channel, in embodiments.

FIG. 10 depicts an example SEM 1000 for a double-interior-non-transmitting-channel, in embodiments. SEM 1000 is an example of one of SEM 412 discussed above. SEM 1000 may be used in any wireless communication bandwidths to "wrap" around two adjacent occupied channels.

SEM 1000 illustrates two non-transmitting channels (channel 2 and channel 3). A similar shape of SEM 1000, as shown and discussed below, may be used for other interior channels of a greater or smaller width wireless communication bandwidth. SEM 1000 is shown for an 80 MHz bandwidth, but could also apply to any other bandwidth widths, including, but not limited to 60 MHz, 100 MHz, 160 MHz, 320 MHz, etc. In channels 1 and 4 there is no relative power attenuation. SEM 1000 includes a first power attenuation 1002 between a first frequency 1004 and a second frequency 1006. In the example of SEM 1000, first frequency 1004 is the low edge (E2$_L$) of channel 2, and the second frequency 1006 is at least 1 MHz greater than the first frequency 1004. The second frequency 1006 may be greater or less than 1 MHz from the first frequency 1004 without departing from the scope hereof. The first attenuation 1002 is from 0 dBr to −20 dBr (e.g., the power spectrum limit is 0 dBr at first frequency 1004, and −20 dBr at second frequency 1006).

SEM 1000 includes a constant attenuation 1007 of −20 dBr between second frequency 1006 and third frequency 1008. In other words, at and between each of the second frequency 1006 and third frequency 1008, the power spectrum limit is −20 dB. The third frequency 1000 is at least 39 MHz greater than the first frequency 1004. The third frequency 1008 may be greater or less than 39 MHz from the first frequency 1004 without departing from the scope hereof.

SEM includes a second power attenuation 1010 between the third frequency 1008 and a fourth frequency 1012. In the example of SEM 1000, fourth frequency 1012 is the high edge (E2$_H$) of channel 3. The second attenuation 1010 is from −20 dBr to 0 dBr (e.g., the power spectrum limit is −20 dBr at third frequency 1008, and 0 dBr at fourth frequency 1012).

In embodiments, SEM 1000 is particularly useful for a double-non-transmitting-channel by a device (e.g., second device 106) operating according to an 802.11 WIFI-based protocol, particularly an 802.11ax protocol. However, the SEM 1000 may be used by a device operating according to other wireless (and/or multi-wireless) protocols without departing from the scope hereof. For example, the SEM 800 may be used in an 802.11 Wi-Fi-based wireless protocol, including but not limited to 802.11ax and/or Wi-Fi 6, as well as any other Wi-Fi based protocols. In such embodiments, use of the SEM 800 may coincide with a transmission rule 420 that only allows its use when the primary channel is unoccupied. As another example, SEM 1000 may be used where one device is operating according to a Wi-Fi based protocol, and another device is operating according to a 5G NR-U protocol. Any other combination of unlicensed wireless protocols (including two devices operating according to the same protocol), including those discussed above, are contemplated herein.

Figure 11:
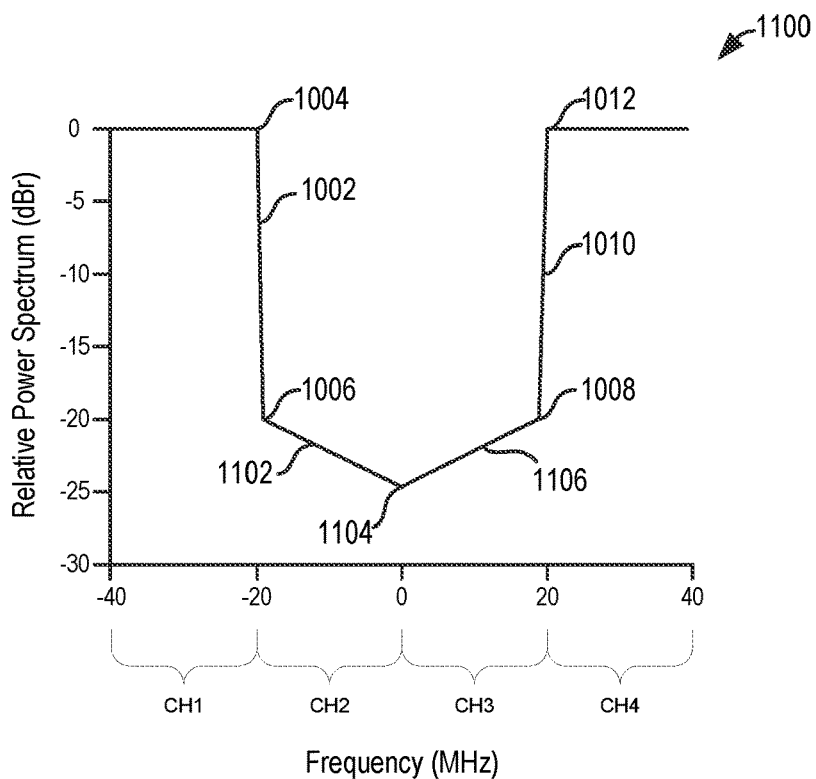
FIG. 11 depicts an example SEM for a double-interior-non-transmitting-channel, in embodiments.

FIG. 11 depicts an example SEM 1100 for a double-interior-non-transmitting-channel, in embodiments. SEM 1100 is an example of one of SEM 412 discussed above. SEM 1100 may be used in any wireless communication bandwidths to "wrap" around two adjacent occupied channels. SEM 1100 is shown for an 80 MHz bandwidth, but could also apply to any other bandwidth widths, including, but not limited to 60 MHz, 100 MHz, 160 MHz, 320 MHz, etc.

SEM 1100 illustrates two adjacent non-transmitting channels (channel 2 and channel 3). A similar shape of SEM 1100, as shown and discussed below, may be used for other interior channels of a greater or smaller width wireless communication bandwidth. SEM 1100 is similar to SEM 1000, and the first frequency 1004, second frequency 1006, third frequency 1008, and fourth frequency 1012, first attenuation 1002, and second attenuation 1010 are the same (and thus labeled the same). However, instead of constant attenuation 1007, SEM 1100 includes a third attenuation 1102 between the second frequency 1006 and a fifth frequency 1104, and a fourth attenuation 1106 between the fifth frequency 1104 and the third frequency 1008.

The fifth frequency 1104 is shown as 20 MHz from the first frequency 1004. The fifth frequency 1104 may be greater or less than 20 MHz from the first frequency 1004 without departing from the scope hereof. The third attenuation 1102 is from −20 dBr to −25 dBr (e.g., the power spectrum limit is −20 dBr at second frequency 1006, and −25 dBr at fifth frequency 1104. The fourth attenuation 1106 is from −25 dBr to −20 dBr (e.g., the power spectrum limit is −25 dBr at fifth frequency 1104, and −20 dBr at third frequency 1008. The lower value of the third and fourth attenuations 1102, 1106 may be higher or lower than −25 dBr without departing from the scope hereof, such as −23 dB, −28 dB, −31 dB, or any other attenuation value needed. The specific shape of the SEM may be defined by the hardware constraints of the device (e.g., second device 106) implementing the SEM.

In embodiments, SEM 1100 is particularly useful for a double-non-transmitting-channel by a device (e.g., second device 106) operating according to an 5G NR-U protocol. However, the SEM 1100 may be used by a device operating according to other wireless protocol (and/or multi-wireless protocol) transmissions without departing from the scope hereof. For example, the SEM 1100 may be used in a device operating according to an 802.11 Wi-Fi-based wireless protocol, including but not limited to 802.11ax and/or Wi-Fi 6, as well as any other Wi-Fi based protocols. In such embodiments, use of the SEM 1100 may coincide with a transmission rule 420 that allows its use when the primary channel is unoccupied. As another example, SEM 100 may be used where one device is operating according to a Wi-Fi based protocol, and another device is operating according to a 5G NR-U protocol. Any other combination of unlicensed wireless protocols, including those discussed above, are contemplated herein.

Figure 12:
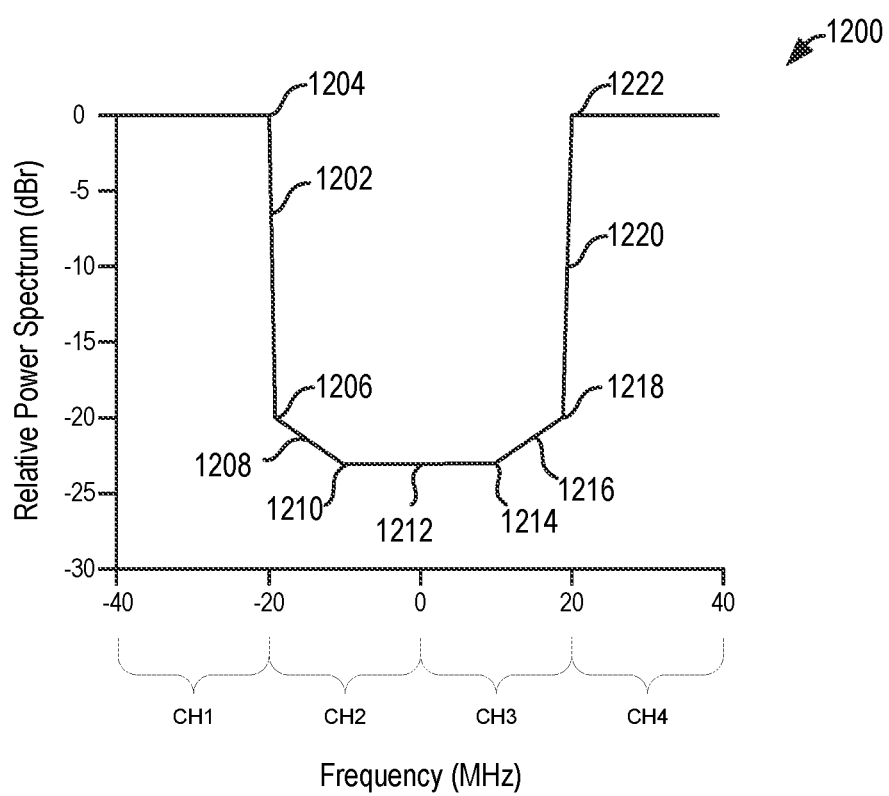
FIG. 12 depicts an example SEM for a double-interior-non-transmitting-channel, in embodiments.

FIG. 12 depicts an example SEM 1200 for a double-interior-non-transmitting-channel, in embodiments. SEM 1200 is an example of one of SEM 412 discussed above. SEM 1200 may be used in any wireless communication bandwidths to "wrap" around two adjacent occupied channels.

SEM 1200 illustrates two non-transmitting channels (channel 2 and channel 3). A similar shape of SEM 1200, as shown and discussed below, may be used for other interior channels of a greater or smaller width wireless communication bandwidth. SEM 1200 is shown for an 80 MHz bandwidth, but could also apply to any other bandwidth widths, including, but not limited to 60 MHz, 100 MHz, 160 MHz, 320 MHz, etc. In channels 1 and 4 there is no relative power attenuation. SEM 1200 includes a first power attenuation 1202 between a first frequency 1204 and a second frequency 1206. In the example of SEM 1200, first frequency 1204 is the low edge ($E2_L$) of channel 2, and the second frequency 1206 is at least 1 MHz greater than the first frequency 1204. The second frequency 1206 may be greater or less than 1 MHz from the first frequency 1204 without departing from the scope hereof. The first attenuation 1202 is from 0 dBr to −20 dBr (e.g., the power spectrum limit is 0 dBr at first frequency 1204, and −20 dBr at second frequency 1206).

SEM 1200 includes a second power attenuation 1208 between the second frequency 1206 and a third frequency 1210. In the example of SEM 1200, the third frequency 1210 is at least 10 MHz greater than the first frequency 1204. The third frequency 1210 may be greater or less than 10 MHz from the first frequency 1204 without departing from the scope hereof. The second attenuation 1208 is from −20 dBr to −23 dBr (e.g., the power spectrum limit is −20 dBr at second frequency 1206, and −23 dBr at third frequency 1210).

SEM 1200 includes a constant attenuation 1212 of −23 dBr between third frequency 1210 and a fourth frequency 1214. In other words, at and between each of the third frequency 1210 and the fourth frequency 1214, the power spectrum limit is −23 dB. The fourth frequency 1214 is at least 30 MHz greater than the first frequency 1204. The fourth frequency 1214 may be greater or less than 30 MHz from the first frequency 1204 without departing from the scope hereof.

SEM 1200 includes a third power attenuation 1216 between the fourth frequency 1214 and a fifth frequency 1218. The fifth frequency 1218 is at least 39 MHz greater than the first frequency 1204. The fifth frequency 1218 may be greater or less than 39 MHz from the first frequency 1204 without departing from the scope hereof. The third attenuation 1216 is from −23 dBr to −20 dBr (e.g., the power spectrum limit is −23 dBr at fourth frequency 1214, and −20 dBr at fifth frequency 1218).

SEM 1200 includes a fourth power attenuation 1220 between the fifth frequency 1218 and a sixth frequency 1222. In the example of SEM 1200, sixth frequency 1222 is the high edge ($E2_H$) of channel 3. The fourth attenuation 1220 is from −20 dBr to 0 dBr (e.g., the power spectrum limit is −20 dBr at fifth frequency 1218, and 0 dBr at the sixth frequency 1222).

In embodiments, SEM 1200 is particularly useful for a double-non-transmitting-channel by a device (e.g., second device 106) operating according to an 5G NR-U protocol. However, the SEM 1200 may be used by a device operating according to other wireless protocol (and/or multi-wireless protocol) transmissions without departing from the scope hereof. For example, the SEM 1200 may be used in a device operating according to an 802.11 Wi-Fi-based wireless protocol, including but not limited to 802.11ax and/or Wi-Fi 6, as well as any other Wi-Fi based protocols. In such embodiments, use of the SEM 1200 may coincide with a transmission rule 420 that allows its use when the primary channel is unoccupied. As another example, SEM 1200 may be used where one device is operating according to a Wi-Fi based protocol, and another device is operating according to a 5G NR-U protocol. Any other combination of unlicensed wireless protocols, including those discussed above, are contemplated herein.

FIG. 13 is a table detailing the differing impacts to the SINR from each of SEMs 1000, 1100, and 1200 of FIGS. 10-12, for varying relative power ($\Delta P_{RX}$) and SNR of the existing signal. The table of FIG. 13 assumes a first case of the first device 102 on channel 2, and the second device 106 transmitting on channels 1 and 4, with a strong SNR of 30 dB; a second case of the first device 102 on channel 2, and the second device 106 transmitting on channels 1 and 4, with a weak SNR of 10 dB; a third case of the first device 102 on channel 3, and the second device 106 transmitting on channels 1 and 4, with a strong SNR of 30 dB; and a fourth case of the first device 102 on channel 3, and the second device 106 transmitting on channels 1 and 4, with a weak SNR of 10 dB. As discussed above, the transmission controller 410 may compare the calculated SINR value 424 to the SINR threshold 422 and disregard ones of the SEMs 412 when use of a given SEM 412 will result in an SINR value 424 that breaches the SINR threshold 422. The table in FIG. 13 is an example of a lookup table used by the transmission controller 410 to identify which potential SEMs may be applied to a given bandwidth occupancy profile 414.

Figure 14:
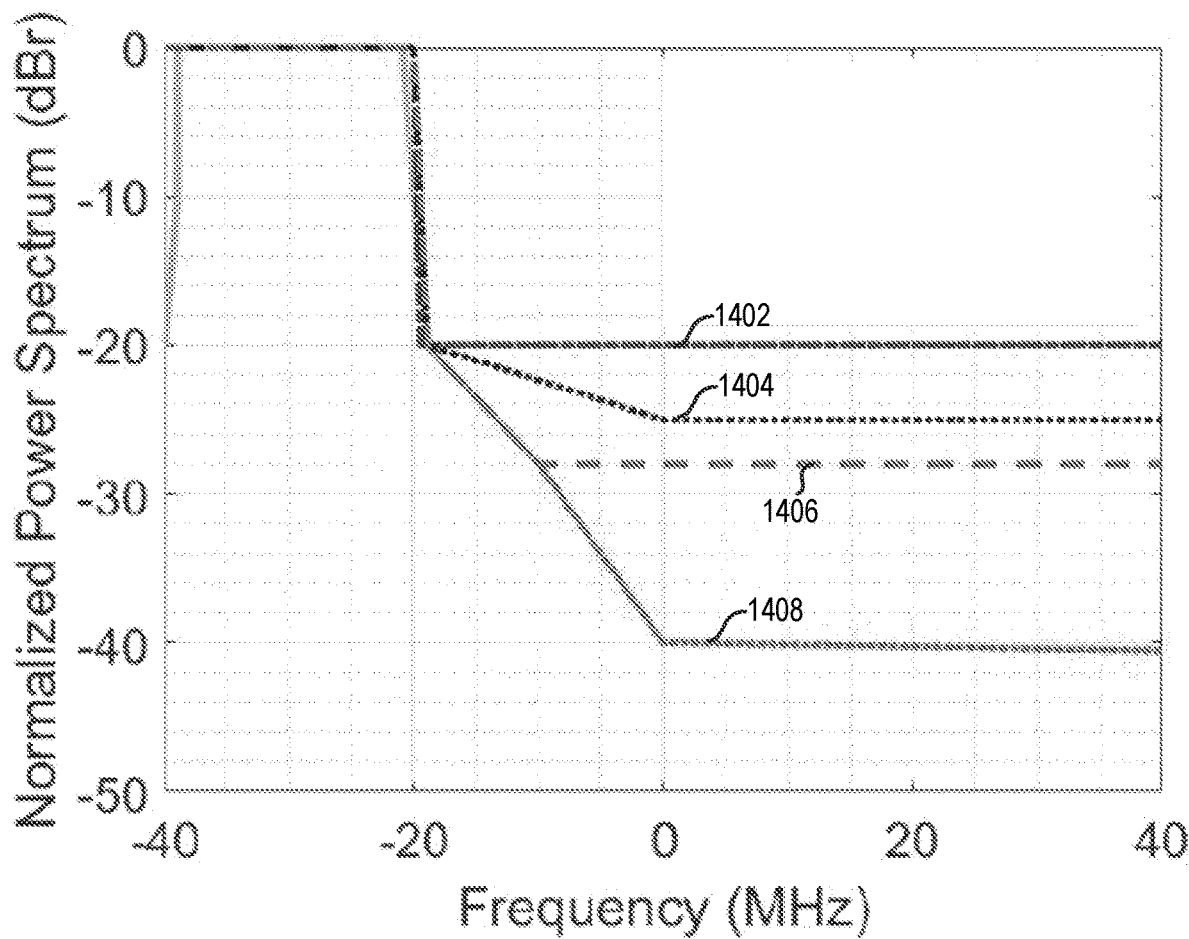
FIG. 14 shows four triple-non-transmitting-edge-channel SEMs superimposed on an 80 MHz bandwidth, in embodiments.

FIG. 14 shows four triple-non-transmitting-edge-channel SEMs 1402, 1404, 1406, and 1408 superimposed on an 80 MHz bandwidth, in embodiments. SEMs 1402, 1404, 1406, and 1408 are particularly useful for 5G NR-U transmissions, but may be used in other Wi-Fi protocols without departing from the scope hereof. FIG. 15 is a table detailing the differing impacts to the SINR from each of SEMs 1402,

1404, and 1406 of FIG. 14, for varying relative power ($\Delta P_{RX}$) and SNR of the existing signal. The table of FIG. 15 assumes a first case of the first device 102 on channel 2, and the second device 106 transmitting on channel 1, with a strong SNR of 30 dB; a second case of the first device 102 on channel 2, and the second device 106 transmitting on channel 1, with a weak SNR of 10 dB; a third case of the first device 102 on channel 3, and the second device 106 transmitting on channel 1, with a strong SNR of 30 dB; a fourth case of the first device 102 on channel 3, and the second device 106 transmitting on channel 1, with a weak SNR of 10 dB; a fifth case of the first device 102 on channel 4, and the second device 106 transmitting on channel 1, with a strong SNR of 30 dB; and a sixth case of the first device 102 on channel 4, and the second device 106 transmitting on channel 1, with a weak SNR of 10 dB. As discussed above, the transmission controller 410 may compare the calculated SINR value 424 to the SINR threshold 422 and disregard ones of the SEMs 412 when use of a given SEM 412 will result in an SINR value 424 that breaches the SINR threshold 422. The table in FIG. 15 is an example of a lookup table used by the transmission controller 410 to identify which potential SEMs may be applied to a given bandwidth occupancy profile 414.

Figure 16:
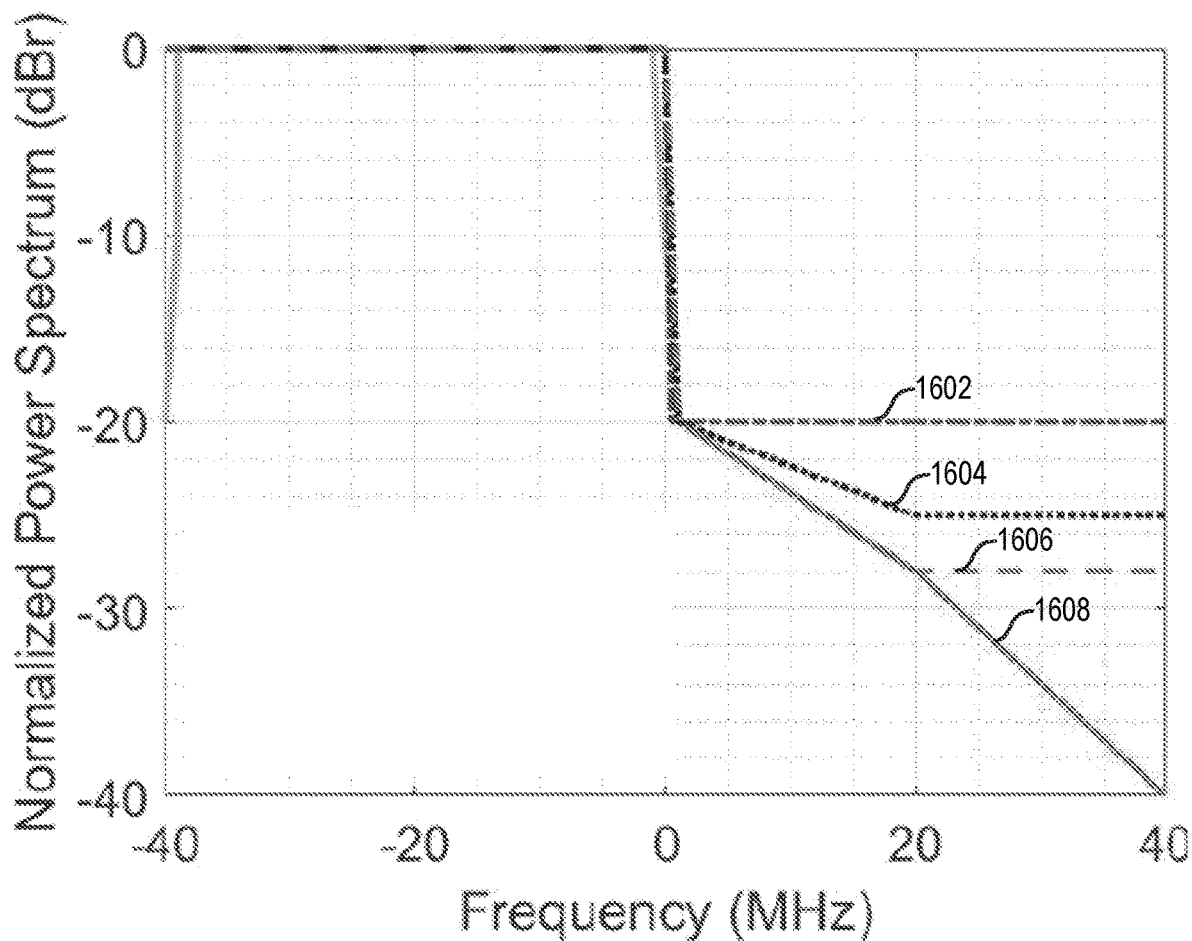
FIG. 16 shows four double-non-transmitting-edge-channel SEMs superimposed on an 80 MHz bandwidth, in embodiments.

FIG. 16 shows four double-non-transmitting-edge-channel SEMs 1602, 1604, 1606, and 1608 superimposed on an 80 MHz bandwidth, in embodiments. SEMs 1602, 1604, 1606, and 1608 are particularly useful for 5G NR-U transmissions, but may be used in other Wi-Fi protocols without departing from the scope hereof. FIG. 17 is a table detailing the differing impacts to the SINR from each of SEMs 1602, 1604, and 1606 of FIG. 16, for varying relative power ($\Delta P_{RX}$) and SNR of the existing signal. The table of FIG. 17 assumes a first case of the first device 102 on channel 3, and the second device 106 transmitting on channels 1 and 2, with a strong SNR of 30 dB; a second case of the first device 102 on channel 3, and the second device 106 transmitting on channels 1 and 2, with a weak SNR of 10 dB; a third case of the first device 102 on channel 4, and the second device 106 transmitting on channels 1 and 2, with a strong SNR of 30 dB; and a fourth case of the first device 102 on channel 4, and the second device 106 transmitting on channels 1 and 2, with a weak SNR of 10 dB. As discussed above, the transmission controller 410 may compare the calculated SINR value 424 to the SINR threshold 422 and disregard ones of the SEMs 412 when use of a given SEM 412 will result in an SINR value 424 that breaches the SINR threshold 422. The table in FIG. 17 is an example of a lookup table used by the transmission controller 410 to identify which potential SEMs may be applied to a given bandwidth occupancy profile 414.

Figure 18:
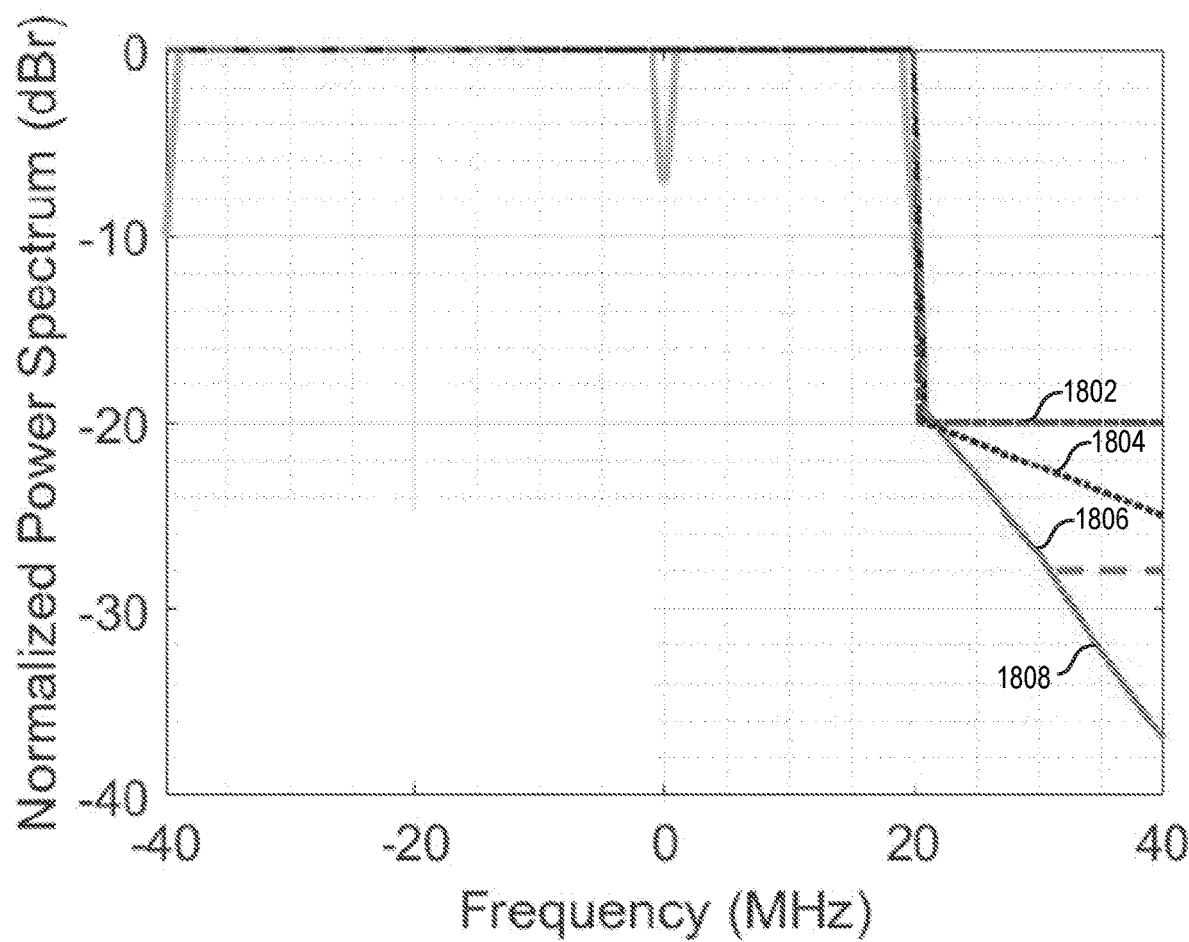
FIG. 18 shows four single-non-transmitting-edge-channel SEMs superimposed on an 80 MHz bandwidth, in embodiments.

FIG. 18 shows four single-non-transmitting-edge-channel SEMs 1802, 1804, 1806, and 1808 superimposed on an 80 MHz bandwidth, in embodiments. SEMs 1802, 1804, 1806, and 1808 are particularly useful for 5G NR-U transmissions, but may be used in other Wi-Fi protocols without departing from the scope hereof. FIG. 19 is a table detailing the differing impacts to the SINR from each of SEMs 1802, 1804, and 1806 of FIG. 18, for varying relative power ($\Delta P_{RX}$) and SNR of the existing signal. The table of FIG. 19 assumes a first case of the first device 102 on channel 4, and the second device 106 transmitting on channels 1 through 3, with a strong SNR of 30 dB; and a second case of the first device 102 on channel 4, and the second device 106 transmitting on channels 1 through 3, with a weak SNR of 10 dB. As discussed above, the transmission controller 410 may compare the calculated SINR value 424 to the SINR threshold 422 and disregard ones of the SEMs 412 when use of a given SEM 412 will result in an SINR value 424 that breaches the SINR threshold 422. The table in FIG. 19 is an example of a lookup table used by the transmission controller 410 to identify which potential SEMs may be applied to a given bandwidth occupancy profile 414.

Figure 20:
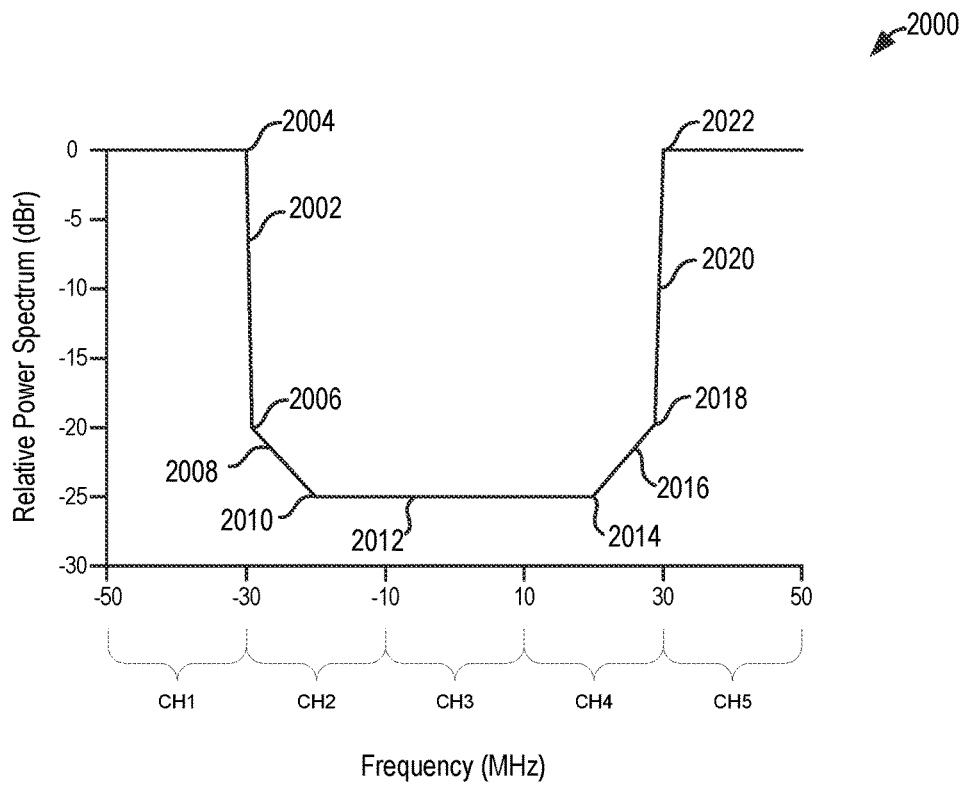
FIG. 20 depicts an example SEM for a triple-interior-non-transmitting-channel, in embodiments.

FIG. 20 depicts an example SEM 2000 for a triple-interior-non-transmitting-channel, in embodiments. SEM 2000 is an example of one of SEM 412 discussed above. SEM 2000 may be used in any wireless communication bandwidths to "wrap" around three adjacent occupied channels.

SEM 2000 illustrates three non-transmitting channels (channels 2-4) of a 100 MHz bandwidth. A similar shape of SEM 2000, as shown and discussed below, may be used for other interior channels of a greater width wireless communication bandwidth. SEM 2000 is shown for a 100 MHz bandwidth, but could also apply to any other bandwidth widths, including, but not limited to 160 MHz, 320 MHz, etc. In channels 1 and 5 there is no relative power attenuation. SEM 2000 includes a first power attenuation 2002 between a first frequency 2004 and a second frequency 2006. In the example of SEM 2000, first frequency 2004 is the low edge (E2$_L$) of channel 2, and the second frequency 2006 is at least 1 MHz greater than the first frequency 2004. The second frequency 2006 may be greater or less than 1 MHz from the first frequency 2004 without departing from the scope hereof. The first attenuation 2002 is from 0 dBr to −20 dBr (e.g., the power spectrum limit is 0 dBr at first frequency 2004, and −20 dBr at second frequency 2006).

SEM 2000 includes a second power attenuation 2008 between the second frequency 2006 and a third frequency 2010. In the example of SEM 2000, the third frequency 2010 is at least 10 MHz greater than the first frequency 2004. The third frequency 2010 may be greater or less than 10 MHz from the first frequency 2004 without departing from the scope hereof. The second attenuation 2008 is from −20 dBr to −25 dBr (e.g., the power spectrum limit is −20 dBr at second frequency 2006, and −25 dBr at third frequency 2010).

SEM 2000 includes a constant attenuation 2012 of −25 dBr between third frequency 2010 and a fourth frequency 2014. In other words, at and between each of the third frequency 2010 and the fourth frequency 2014, the power spectrum limit is −25 dB. The fourth frequency 2014 is at least 50 MHz greater than the first frequency 2004. The fourth frequency 2014 may be greater or less than 50 MHz from the first frequency 2004 without departing from the scope hereof.

SEM 2000 includes a third power attenuation 2016 between the fourth frequency 2014 and a fifth frequency 2018. The fifth frequency 2018 is at least 59 MHz greater than the first frequency 2004. The fifth frequency 2018 may be greater or less than 59 MHz from the first frequency 2004 without departing from the scope hereof. The third attenuation 2016 is from −25 dBr to −20 dBr (e.g., the power spectrum limit is −25 dBr at fourth frequency 2014, and −20 dBr at fifth frequency 2018).

SEM 2000 includes a fourth power attenuation 2020 between the fifth frequency 2018 and a sixth frequency 2022. In the example of SEM 2000, sixth frequency 2022 is the high edge (E2$_H$) of channel 4. The fourth attenuation 2020 is from −20 dBr to 0 dBr (e.g., the power spectrum limit is −20 dBr at fifth frequency 2018, and 0 dBr at the sixth frequency 2022).

In embodiments, SEM 2000 is particularly useful for a triple-non-transmitting-channel by a device (e.g., second device 106) operating according to an 5G NR-U protocol. However, the SEM 2000 may be used by a device operating according to other wireless protocol (and/or multi-wireless protocol) transmissions without departing from the scope hereof. For example, the SEM 2000 may be used in a device operating according to an 802.11 Wi-Fi-based wireless protocol, including but not limited to 802.11ax and/or Wi-Fi 6, as well as any other Wi-Fi based protocols. In such embodiments, use of the SEM 2000 may coincide with a transmission rule 420 that allows its use when the primary channel is unoccupied. As another example, SEM 2000 may be used where one device is operating according to a Wi-Fi based protocol, and another device is operating according to a 5G NR-U protocol. Any other combination of unlicensed wireless protocols, including those discussed above, are contemplated herein.

Figure 21:
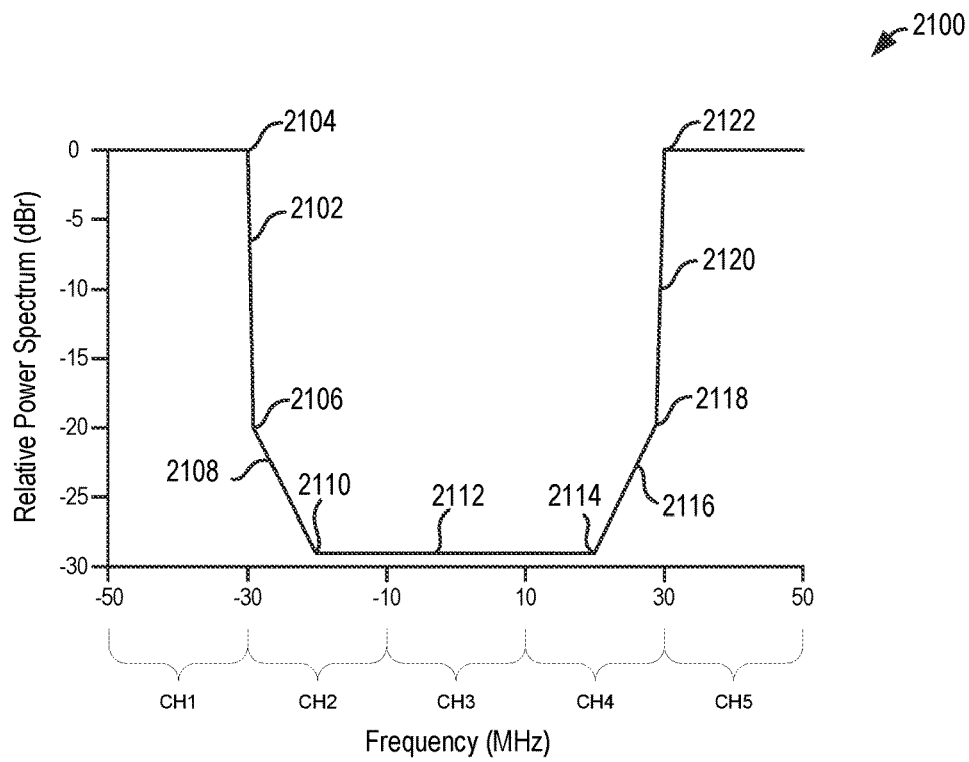
FIG. 21 depicts an example SEM for a triple-interior-non-transmitting-channel, in embodiments.

FIG. 21 depicts an example SEM 2100 for a triple-interior-non-transmitting-channel, in embodiments. SEM 2100 is an example of one of SEM 412 discussed above. SEM 2100 may be used in any wireless communication bandwidths to "wrap" around three adjacent occupied channels.

SEM 2100 illustrates three non-transmitting channels (channels 2-4) of a 100 MHz bandwidth. A similar shape of SEM 2100, as shown and discussed below, may be used for other interior channels of a greater width wireless communication bandwidth. SEM 2100 is shown for a 100 MHz bandwidth, but could also apply to any other bandwidth widths, including, but not limited to 160 MHz, 320 MHz, etc. In channels 1 and 5 there is no relative power attenuation. SEM 2100 includes a first power attenuation 2102 between a first frequency 2104 and a second frequency 2106. In the example of SEM 2100, first frequency 2104 is the low edge ($E2_L$) of channel 2, and the second frequency 2106 is at least 1 MHz greater than the first frequency 2104. The second frequency 2106 may be greater or less than 1 MHz from the first frequency 2104 without departing from the scope hereof. The first attenuation 2102 is from 0 dBr to −20 dBr (e.g., the power spectrum limit is 0 dBr at first frequency 2104, and −20 dBr at second frequency 2106).

SEM 2100 includes a second power attenuation 2108 between the second frequency 2106 and a third frequency 2110. In the example of SEM 2100, the third frequency 2110 is at least 10 MHz greater than the first frequency 2104. The third frequency 2110 may be greater or less than 10 MHz from the first frequency 2104 without departing from the scope hereof. The second attenuation 2108 is from −20 dBr to −28 dBr (e.g., the power spectrum limit is −20 dBr at second frequency 2106, and −28 dBr at third frequency 2110).

SEM 2100 includes a constant attenuation 2112 of −28 dBr between third frequency 2110 and a fourth frequency 2114. In other words, at and between each of the third frequency 2110 and the fourth frequency 2114, the power spectrum limit is −28 dB. The fourth frequency 2114 is at least 50 MHz greater than the first frequency 2104. The fourth frequency 2114 may be greater or less than 50 MHz from the first frequency 2104 without departing from the scope hereof.

SEM 2100 includes a third power attenuation 2116 between the fourth frequency 2114 and a fifth frequency 2118. The fifth frequency 2118 is at least 59 MHz greater than the first frequency 2104. The fifth frequency 2118 may be greater or less than 59 MHz from the first frequency 2104 without departing from the scope hereof. The third attenuation 2116 is from −28 dBr to −20 dBr (e.g., the power spectrum limit is −28 dBr at fourth frequency 2114, and −20 dBr at fifth frequency 2118).

SEM 2100 includes a fourth power attenuation 2120 between the fifth frequency 2118 and a sixth frequency 2122. In the example of SEM 2100, sixth frequency 2122 is the high edge ($E2_H$) of channel 4. The fourth attenuation 2120 is from −20 dBr to 0 dBr (e.g., the power spectrum limit is −20 dBr at fifth frequency 2118, and 0 dBr at the sixth frequency 2122).

In embodiments, SEM 2100 is particularly useful for a triple-non-transmitting-channel by a device (e.g., second device 106) operating according to an 5G NR-U protocol. However, the SEM 2100 may be used by a device operating according to other wireless protocol (and/or multi-wireless protocol) transmissions without departing from the scope hereof. For example, the SEM 2100 may be used in a device operating according to an 802.11 Wi-Fi-based wireless protocol, including but not limited to 802.11ax and/or Wi-Fi 6, as well as any other Wi-Fi based protocols. In such embodiments, use of the SEM 2100 may coincide with a transmission rule 420 that allows its use when the primary channel is unoccupied. As another example, SEM 2100 may be used where one device is operating according to a Wi-Fi based protocol, and another device is operating according to a 5G NR-U protocol. Any other combination of unlicensed wireless protocols, including those discussed above, are contemplated herein.

Figure 22:
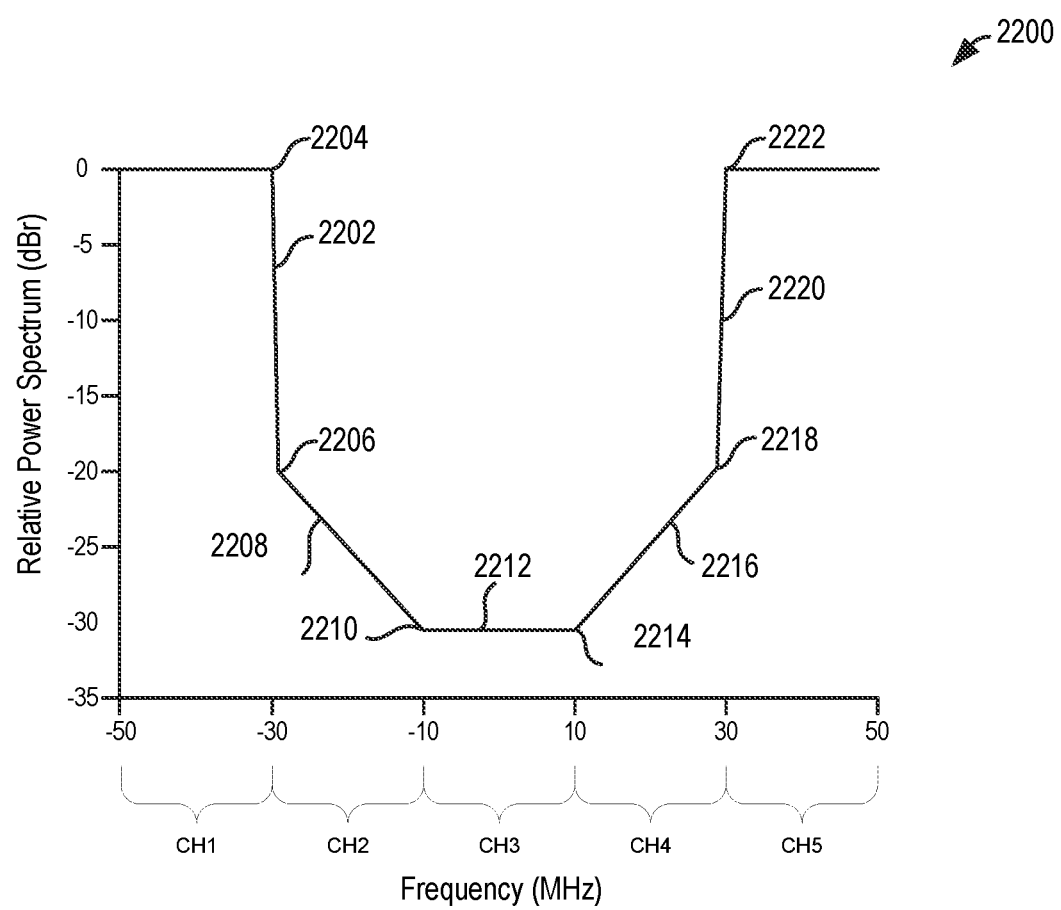
FIG. 22 depicts an example SEM for a triple-interior-non-transmitting-channel, in embodiments.

FIG. 22 depicts an example SEM 2200 for a triple-interior-non-transmitting-channel, in embodiments. SEM 2200 is an example of one of SEM 412 discussed above. SEM 2200 may be used in any wireless communication bandwidths to "wrap" around three adjacent occupied channels.

SEM 2200 illustrates three non-transmitting channels (channels 2-4) of a 100 MHz bandwidth. A similar shape of SEM 2200, as shown and discussed below, may be used for other interior channels of a greater width wireless communication bandwidth. SEM 2200 is shown for a 100 MHz bandwidth, but could also apply to any other bandwidth widths, including, but not limited to 160 MHz, 320 MHz, etc. In channels 1 and 5 there is no relative power attenuation. SEM 2200 includes a first power attenuation 2202 between a first frequency 2204 and a second frequency 2206. In the example of SEM 2200, first frequency 2204 is the low edge ($E2_L$) of channel 2, and the second frequency 2206 is at least 1 MHz greater than the first frequency 2204. The second frequency 2206 may be greater or less than 1 MHz from the first frequency 2204 without departing from the scope hereof. The first attenuation 2202 is from 0 dBr to −20 dBr (e.g., the power spectrum limit is 0 dBr at first frequency 2204, and −20 dBr at second frequency 2206).

SEM 2200 includes a second power attenuation 2208 between the second frequency 2206 and a third frequency 2210. In the example of SEM 2200, the third frequency 2210 is at least 20 MHz greater than the first frequency 2204. The third frequency 2210 may be greater or less than 20 MHz from the first frequency 2204 without departing from the scope hereof. The second attenuation 2208 is from −20 dBr to −31 dBr (e.g., the power spectrum limit is −20 dBr at second frequency 2206, and −31 dBr at third frequency 2210).

SEM 2200 includes a constant attenuation 2212 of −31 dBr between third frequency 2210 and a fourth frequency 2214. In other words, at and between each of the third frequency 2210 and the fourth frequency 2214, the power spectrum limit is −31 dB. The fourth frequency 2214 is at least 40 MHz greater than the first frequency 2204. The fourth frequency 2214 may be greater or less than 40 MHz from the first frequency 2204 without departing from the scope hereof.

SEM 2200 includes a third power attenuation 2216 between the fourth frequency 2214 and a fifth frequency 2218. The fifth frequency 2218 is at least 59 MHz greater than the first frequency 2204. The fifth frequency 2218 may be greater or less than 59 MHz from the first frequency 2204 without departing from the scope hereof. The third attenuation 2216 is from −31 dBr to −20 dBr (e.g., the power spectrum limit is −31 dBr at fourth frequency 2214, and −20 dBr at fifth frequency 2218).

SEM 2200 includes a fourth power attenuation 2220 between the fifth frequency 2218 and a sixth frequency 2222. In the example of SEM 2200, sixth frequency 2222 is the high edge ($E2_H$) of channel 4. The fourth attenuation 2220 is from −20 dBr to 0 dBr (e.g., the power spectrum limit is −20 dBr at fifth frequency 2218, and 0 dBr at the sixth frequency 2222).

In embodiments, SEM 2200 is particularly useful for a triple-non-transmitting-channel by a device (e.g., second device 106) operating according to an 5G NR-U protocol. However, the SEM 2200 may be used by a device operating according to other wireless protocol (and/or multi-wireless protocol) transmissions without departing from the scope hereof. For example, the SEM 2200 may be used in a device operating according to an 802.11 Wi-Fi-based wireless protocol, including but not limited to 802.11ax and/or Wi-Fi 6, as well as any other Wi-Fi based protocols. In such embodiments, use of the SEM 2200 may coincide with a transmission rule 420 that allows its use when the primary channel is unoccupied. As another example, SEM 2200 may be used where one device is operating according to a Wi-Fi based protocol, and another device is operating according to a 5G NR-U protocol. Any other combination of unlicensed wireless protocols, including those discussed above, are contemplated herein.

FIG. 23 is a table representation of SEMS 2000, 2100, and 2200. Comparison of FIGS. 20-22 illustrates the concept that the shape of the SEM may vary depending on the hardware requirements of the associated devices implementing said SEM. Furthermore, the frequency at which a given attenuation occurs may differ (e.g., the second attenuation in FIGS. 20 and 21 are from 1 MHz to 30 MHz from the first frequency, whereas the second attenuation in FIG. 22 is from 1 MHz to 20 MHz from the first frequency). Thus, the scope of this disclosure covers any SEM within the range of SEMs disclosed, as well as those SEMs outside of said ranges that cover single-, double-, and/or triple-interior-non-transmitting-channel SEMs. Furthermore, the attenuations shown and discussed above with respect to SEMs 800, 900, 1000, 1100, 1200, 1402, 1404, 1406, 1408, 1602, 1604, 1606, 1608, 1802, 1804, 1806, 1808, 2000, 2100, and 2200 are shown as straight lines. The attenuations may have different shapes without departing from the scope hereof, such as curved attenuations from one frequency point to the next.

Figure 24:
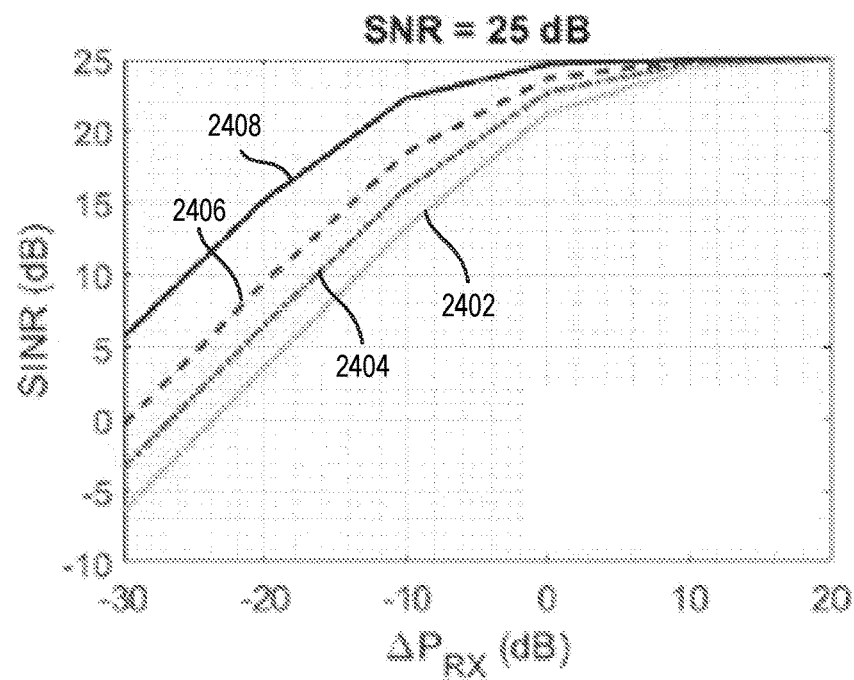
FIG. 24 shows the SINR values of SEMs of FIGS. 20-21 with respect to an existing signal on channel 3, assuming a 25 dB SNR, in embodiments.
Figure 25:
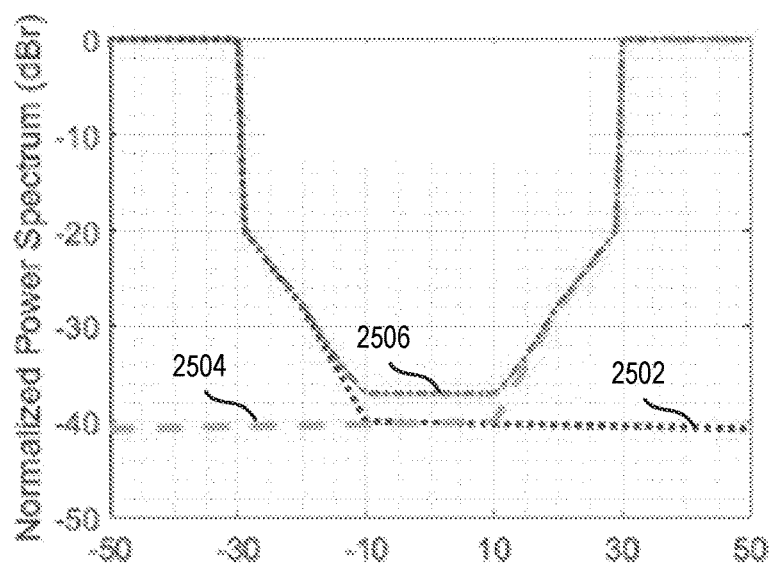
FIG. 25 illustrates an example reference SEM.

FIG. 24 shows the SINR values of SEMs 2000, 2100, and 2200 with respect to an existing signal on channel 3, assuming a 25 dB SNR, in embodiments. Line 2402 represents SEM 2000; line 2404 represents SEM 2100; line 2406 represents SEM 2200, and line 2408 represents a reference line of the NR-U signal. The reference NR-U SEM is combined by two single-carrier NR-U SEMs. FIG. 25 illustrates an example reference SEM where line 2502 is a single carrier 20 MHz SEM that uses the channel from −50 to −30 MHz. Line 2504 is a single carrier 20 MHz SEM uses the channel from 30 to 50 MHz. Line 2506 is the reference SEM combined by lines 2502 and 2504.

Figure 26:
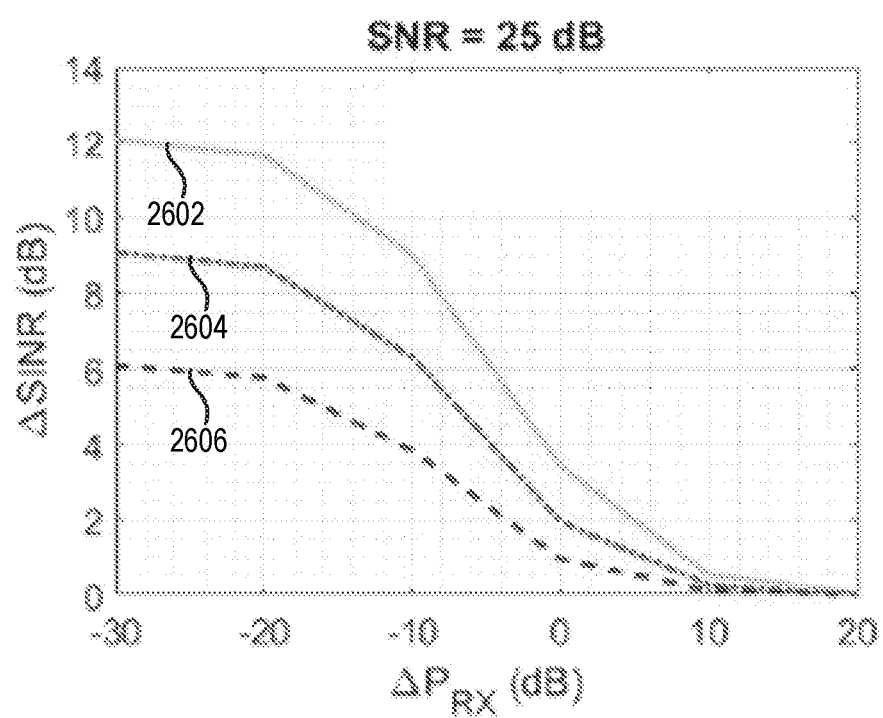
FIG. 26 shows the SINR degradation of SEMs of FIGS. 20-21 as compared to the reference case of FIG. 25.

The higher the SINR, the better. FIG. 26 shows the SINR degradation of SEMs 2000, 2100, and 2200 as compared to the reference case (e.g. line 2506). SINR degradation is undesirable in that it indicates more interference with the existing signal on the bandwidth. Line 2602 represents SEM 2000; line 2604 represents SEM 2100; line 2606 represents SEM 2200. FIG. 27 depicts a table representation of FIG. 26, as well as additional SINR degradation for the first device operating on channel 2 and 4.

The information in FIGS. 24-27 establishes $\Delta P_{RX}=0$ dBr and the first device (e.g., device 102) uses channel 3 with 25 dB SNR: SEM 2000 has the largest SINR degradation of 3.4 dB, which is 0.9 and 1.9 dBr for SEM 2100 and 2200, respectively. Additionally, for $\Delta P_{RX}=-10$ dBr and the first device uses channel 3 with 25 dB SNR: SEM 2000 has the largest SINR degradation of 9 dB; SEM 2100 has a SINR reduction of 6.3 dB; and SEM 2200 has the smallest SINR degradation 3.8 dB. This information may be used by transmission controller 410 to identify which SEM 412 to utilize with a given bandwidth occupancy profile 414.

Figure 28:
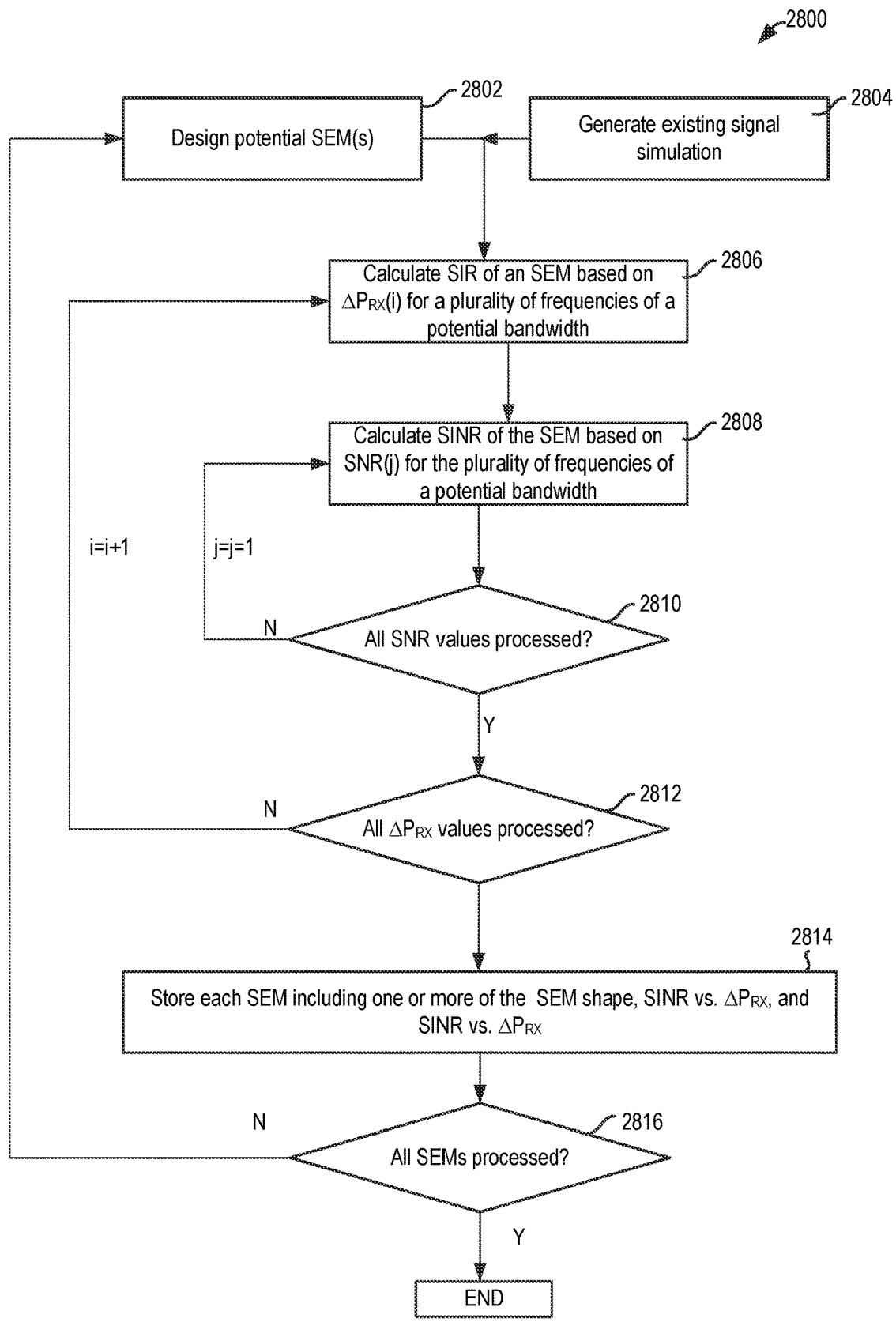
FIG. 28 depicts a method for generating a library of spectrum emission masks, in embodiments.

FIG. 28 depicts a method 2800 for generating a library of spectrum emission masks, in embodiments. Method 2800 may be implemented as computer readable instructions that, when executed by a processor, control the processor to implement the functionality of the method 2800 described below. Method 2800 may be used to create the SEM library 408 of FIG. 4, above.

In block 2802, a potential SEM shape is designed. In an example of block 2802, any one or more of the above discussed SEMs, including but not limited to, SEMs 800, 900, 1000, 1100, 1200, 1402, 1404, 1406, 1408, 1602, 1604, 1606, 1608, 1802, 1804, 1806, 1808, 2000, 2100, and 2200 are designed. The designed SEMs in block 2802 are designed based on hardware and firmware constraints of the given device that will utilize the SEM (e.g., second device 106).

In block 2804, an existing signal simulation is generated. In one example of block 2804, the simulation signal is generated having the characteristics of existing signal 300.

In block 2806, the method 2800 calculates the SIR for one of the SEMs based on $\Delta P_{RX}(i)$ for a plurality of frequencies of a potential bandwidth. For example, the SIR of one of the SEM(s) from block 2802 is calculated over a 60 MHz, 80 MHz, 100 MHz, 160 MHz, 320 MHz or other bandwidth based on an $i^{th}$ $\Delta P_{RX}(i)$ value of the existing signal from block 2804.

In block 2808, the method 2800 calculates the SINR for the one of the SEMs based on a $i^{th}$ SNR(j) for a plurality of frequencies of the potential bandwidth used in block 2806.

Block 2810 is a decision. If each potential SNR value is processed, then method 2800 proceeds to block 2812, else method 2800 repeats block 2808, incrementing to the next $j^{th}$ SNR value, until all SNR values are calculated.

Block 2812 is a decision. If each potential $\Delta P_{RX}(i)$ value is processed, then method 2800 proceeds to block 2814, else method 2800 repeats block 2806 (and blocks 2808-2810), incrementing to the next ith $\Delta P_{RX}(i)$ value, until all $\Delta P_{RX}(i)$ values are calculated.

In block 2814, method 2800 stores each SEM including one or more of the SEM shape, SINR vs. $\Delta P_{RX}$, and SINR vs. $\Delta P_{RX}$ for the in-process SEM. In one example of operation of block 2814, each in-process SEM is stored as one of the SEMs 412 in SEM library 408.

In block 2816, method 2800 determines if all potential SEMs design in block 2802 have been processed. If yes, the method 2800 ends, else method 2800 loops to block 2802 (or 2806).

Figure 29:
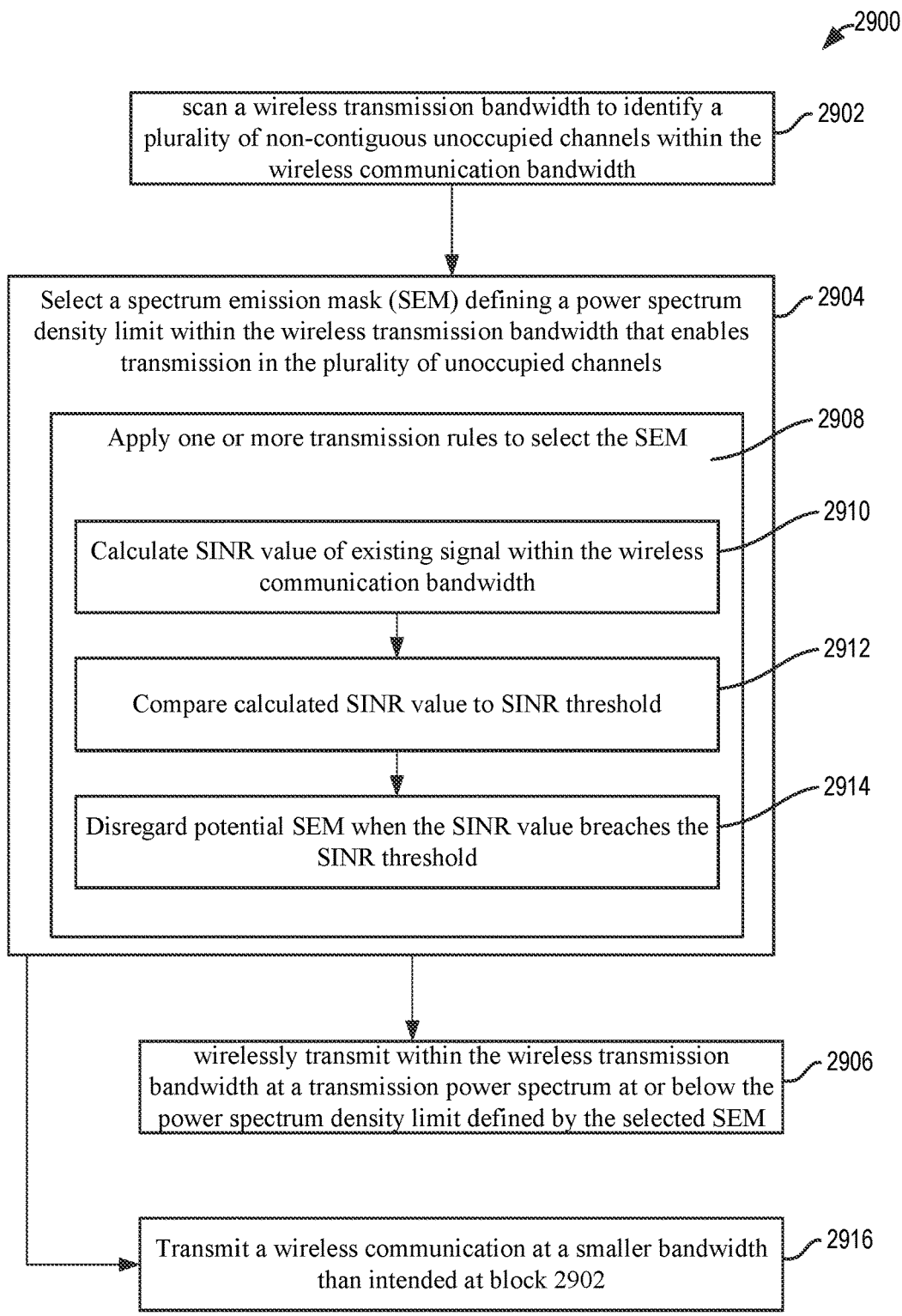
FIG. 29 shows a method for wireless communication over a common bandwidth.

FIG. 29 shows a method 2900 for wireless communication over a common bandwidth. Method 2900 is implemented, for example, as computer readable instructions that embody the transmission controller 410 of FIG. 4.

In block 2902, method 2900 scans a wireless transmission bandwidth to identify a plurality of non-contiguous unoccupied channels within the wireless communication bandwidth. In one example of block 2900, a listening device (e.g., second device 106) scans a wireless communication bandwidth (e.g., common wireless communication bandwidth 110) and generates the bandwidth occupancy profile 414.

In block 2904, method 2900 selects a spectrum emission mask (SEM) defining a power spectrum density limit within the wireless transmission bandwidth that enables transmission in the plurality of unoccupied channels. In one example of operation of block 2904, the second device 106 is device 400 of FIG. 4, and it selects one of SEMs 412 from the SEM library 408.

In block 2906, method 2900 wirelessly transmits within the wireless transmission bandwidth at a transmission power spectrum at or below the power spectrum density limit. In one example of operation of block 2906, the second device 106 configures its RF front-end (e.g., RF front-end 404) according to RF front-end settings 416 such that the second device 106 transmits a wireless communication within the common wireless communication bandwidth 110 at or below the power spectrum density limit defined by a selected one of the SEMs 412.

Method 2900 may include a plurality of additional steps. For example, block 2904 may include one or more sub-blocks. In sub-block 2908, method 2900 applies one or more transmission rules to select the SEM. In one example of block 2908, the second device 106 applies one or more transmission rules 420. For example, the transmission rule 420 in embodiments implementing an 802.11 Wi-Fi-based wireless protocol, including but not limited to 802.11ax and/or Wi-Fi 6, as well as any other Wi-Fi based protocol(s), may only allow its use on secondary Wi-Fi channels; in such case, the selected SEM will include transmitted channels in the corresponding secondary channels of the common wireless communication bandwidth 110.

In sub-block 2910, method 2900 calculates an SINR value of an existing signal within the wireless communication bandwidth. In one example of sub-block 2910, the SNR value 424 is calculated based on the existing signal defined in the bandwidth occupancy profile 414.

In sub-block 2912, method 2900 compares the calculated SINR value to an SINR threshold. In one example of sub-block 2912, the transmission controller 410 compares the SINR value 424 to the SINR threshold 422.

In sub-block 2914, method 2900 disregards a potential SEM when the SINR value breaches the SINR threshold. In one example of sub-block 2914, potential one(s) of the SEM 412 are disregarded by the transmission controller 410 when the SINR value 424 breaches the SINR threshold 422.

Method 2900 may further implement block 2916 which, when a SEM is unavailable in block 2904, reduces the transmitting bandwidth to a smaller bandwidth than intended at block 2902. In one example of block 2916, when none of the SEMs 412 are available, the device 106 may apply communication bandwidth reduction 418 to fit the to-be-transmitted communication to one or more available channels within the common wireless communication bandwidth 110.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wireless communication method, comprising:
scanning, using a first device, a wireless communication bandwidth to identify a plurality of non-contiguous unoccupied channels within the wireless communication bandwidth;
selecting, at the first device, a spectrum emission mask (SEM) defining a power spectrum density limit within the wireless communication bandwidth that enables transmission by the first device in the plurality of unoccupied channels; and
wirelessly transmitting from the first device within the wireless communication bandwidth at a transmission power spectrum at or below the power spectrum density limit.

2. The method of claim 1, further comprising scanning, using the first device, the wireless communication bandwidth to identify one or more occupied channels within the wireless communication bandwidth.

3. The method of claim 1, the unoccupied channels further unoccupied by at least one second device.

4. The method of claim 3, wherein the first device operates according to a first communication protocol, and the at least one second device that operates according to a second communication protocol.

5. The method of claim 4, the first communication protocol being 5G new radio unlicensed (NR-U).

6. The method of claim 4, the first communication protocol an 802-based protocol.

7. The method of claim 6, the first communication protocol an 802.11-based protocol.

8. The method of claim 6, the first communication protocol an 802.16-based protocol.

9. The method of claim 3, the first device operating according to a first wireless operator, the at least one second device operating according to a second wireless carrier.

10. The method of claim 1, the wireless communication bandwidth spanning 40, 60, 80, 100, 160, or 320 MHz.

11. The method of claim 1, wherein, when a first of the plurality of non-contiguous unoccupied channels is separated from a second of the plurality of the non-contiguous unoccupied channels by a single occupied channel, the selecting the SEM includes selecting from a group of SEMs including a single-interior-non-transmitted-channel SEM and a double-interior-non-transmitted-channel SEM.

12. The method of claim 11, the group of SEMs further including a triple-interior-non-transmitted-channel SEM.

13. The method of claim 1, wherein, when a first of the plurality of non-contiguous unoccupied channels is separated from a second of the plurality of the non-contiguous unoccupied channels by a single occupied channel, the selecting the SEM includes a single-interior-non-transmitted-channel SEM.

14. The method of claim 1, wherein, when a first of the plurality of non-contiguous unoccupied channels is separated from a second of the plurality of the non-contiguous unoccupied channels by a single occupied channel, the selecting the SEM includes a double-interior-non-transmitted-channel SEM.

15. The method of claim 1, wherein, when a first of the plurality of the non-contiguous unoccupied channels is separated from a second of the plurality of the non-contiguous unoccupied channels by a single occupied channel, the selecting the SEM includes a triple-interior-non-transmitted-channel SEM.

16. The method of claim 1, wherein, when a first of the plurality of the non-contiguous unoccupied channels is separated by a second of the plurality of the non-contiguous unoccupied channels by two occupied channels, the selecting the SEM including selecting from a group of SEMs including a double-interior-puncture SEM.

17. The method of claim 16, the group of SEMs further including a triple-interior-non-transmitted-channel SEM.

18. The method of claim 1, wherein, when a first of the plurality of the non-contiguous unoccupied channels is separated by a second of the plurality of the non-contiguous unoccupied channels by two occupied channels, the selecting the SEM including selecting from a group of SEMs including a triple-interior-puncture SEM.

19. The method of claim 1, the SEM being a single-interior-non-transmitted-channel SEM defined for a first frequency, a second frequency, a third frequency, a fourth frequency, and a fifth frequency; wherein:
   a first attenuation includes 0 dBr at the first frequency and −20 dBr at the second frequency, the second frequency being at least 1 MHz greater than the first frequency;
   a second attenuation includes −20 dBr at the second frequency and −23 dBr at the third frequency, the third frequency being at least 10 MHz greater than the first frequency;
   a third attenuation includes −23 dBr at the third frequency and −20 dBr at the fourth frequency, the fourth frequency being at least 19 MHz greater than the first frequency; and
   a fourth attenuation includes −20 dBr at the fifth frequency and 0 dBr at the fifth frequency, the fifth frequency being 20 MHz greater than the first frequency.

20. The method of claim 1, the SEM being a double-interior-non-transmitted-channel SEM defined for a first frequency, a second frequency, a third frequency, a fourth frequency, a fifth frequency, and a sixth frequency; wherein:
   a first attenuation includes 0 dBr at the first frequency and −20 dBr at the second frequency, the second frequency being 1 MHz or greater than the first frequency;
   a second attenuation includes −20 dBr at the second frequency and between and including −20 dBr to −25 dBr at the third frequency, the third frequency being at least 10 MHz greater than the first frequency;
   a third attenuation delta includes between and including −20 dBr to −25 dBr at the fourth frequency and −20 dBr at the fifth frequency, the fifth frequency being at least 39 MHz greater than the first frequency; and
   a fourth attenuation delta from −20 dBr to 0 dBr between the fifth frequency and the sixth frequency, the sixth frequency greater than the fifth frequency.

21. The method of claim 20, the third frequency being the same as the fourth frequency.

22. The method of claim 20, the third frequency being 10 MHz greater than the first frequency, the fourth frequency being 30 MHz greater than the first frequency, the SEM further defined by a constant attenuation of between and including −20 dBr to −25r dBr between the third and fourth frequency.

23. The method of claim 1, the SEM being a triple-interior-non-transmitted-channel SEM defined for a first frequency, a second frequency, a third frequency, a fourth frequency, a fifth frequency, and a sixth frequency; wherein:
   a first attenuation including 0 dBr at the first frequency and −20 dBr at the second frequency, the second frequency being 1 MHz or greater than the first frequency;
   a second attenuation including −20 dBr at the second frequency and between and including −25 dBr to −31 dBr at the third frequency, the third frequency being at least 10 MHz greater than the first frequency;
   a third attenuation including −25 dBr to −31 dBr at the fourth frequency to −20 dBr at the fifth, the fourth frequency being at least 40 MHz greater than the first frequency, the fifth frequency being at least 59 MHz greater than the first frequency; and
   a fourth attenuation delta from −20 dBr to 0 dBr between the fifth frequency and the sixth frequency, the sixth frequency greater than the fifth frequency.

24. The method of claim 23, the SEM further defined by a constant attenuation of between and including −25 dBr to −31 dBr between the third and fourth frequency.

25. The method of claim 23, the third frequency being 10 MHz greater than the first frequency; the fourth frequency being 50 MHz greater than the first frequency.

26. The method of claim 23, the third frequency being 20 MHz greater than the first frequency; the fourth frequency being 40 MHz greater than the first frequency.

27. The method of claim 1, further comprising: applying one or more transmission rules when selecting the SEM, the transmission rules including one or more of:
   only allowing transmission on a secondary channel of the wireless communication bandwidth; and,
   an SINR value of an existing signal in the wireless communication bandwidth cannot breach an SINR threshold.

28. The method of claim 1, further comprising, when no SEM is selectable, applying a communication bandwidth reduction and wirelessly transmitting, from the first device, at a reduced bandwidth defined by the communication bandwidth reduction.

29. A device for wireless communication, comprising:
   a transmission controller implemented as non-transitory computer readable instructions that, when executed by a processor, cause the device to:
      scan a wireless transmission bandwidth to identify a plurality of non-contiguous unoccupied channels within a wireless communication bandwidth and unoccupied by another device different than the device;
      select a spectrum emission mask (SEM) defining a power spectrum density limit within the wireless communication bandwidth that enables transmission by the device in the plurality of unoccupied channels; and,
      wirelessly transmit within the wireless communication bandwidth at a transmission power spectrum at or below the power spectrum density limit.

* * * * *